US005965247A

United States Patent [19]
Jonza et al.

[11] Patent Number: 5,965,247
[45] Date of Patent: *Oct. 12, 1999

[54] PROCESS FOR FORMING REFLECTIVE POLARIZER

[75] Inventors: James M. Jonza, Round Rock, Tex.; Michael F. Weber, Shoreview, Minn.; Andrew J. Ouderkirk, Woodbury, Minn.; Carl A. Stover, St. Paul, Minn.

[73] Assignee: 3M Innovative Properties Company, St. Paul, Minn.

[*] Notice: This patent is subject to a terminal disclaimer.

[21] Appl. No.: 08/958,329

[22] Filed: Oct. 28, 1997

Related U.S. Application Data

[63] Continuation of application No. 08/402,041, Mar. 10, 1995, Pat. No. 5,882,774, which is a continuation-in-part of application No. 08/171,239, Dec. 21, 1993, abandoned, and application No. 08/359,436, Dec. 20, 1994, abandoned.

[51] Int. Cl.$^6$ .......................... B32B 27/08; B32B 27/36; B32B 31/16; B32B 31/30
[52] U.S. Cl. .......................... 428/212; 428/480; 428/910; 359/487; 359/494; 359/500; 359/577; 359/580; 359/586; 264/173.11; 264/173.15; 264/288.4; 264/290.2
[58] Field of Search .................... 428/480, 910, 428/212; 264/173.11, 173.2, 173.15, 280, 288.4, 290.2; 359/485, 487, 488, 494, 500, 577, 580, 586

[56] References Cited

U.S. PATENT DOCUMENTS

| Re. 34,605 | 5/1994 | Schrenk et al. | 359/359 |
|---|---|---|---|
| 2,776,598 | 1/1957 | Dreyer | 88/105 |
| 2,887,566 | 5/1959 | Marks | 240/9.5 |
| 3,124,639 | 3/1964 | Kahn | 88/65 |
| 3,213,753 | 10/1965 | Rogers | 88/65 |
| 3,423,498 | 1/1969 | Lefevre | 264/171 |
| 3,480,502 | 11/1969 | Schrenk | 156/271 |
| 3,498,873 | 3/1970 | Schrenk | 161/109 |
| 3,556,635 | 1/1971 | Schrenk et al. | 350/96 |
| 3,565,985 | 2/1971 | Schrenk et al. | 264/171 |
| 3,600,587 | 8/1971 | Smith | 250/199 |
| 3,610,729 | 10/1971 | Rogers | 350/157 |
| 3,711,176 | 1/1973 | Alfrey, Jr. et al. | 350/1 |
| 3,746,485 | 7/1973 | Schrenk | 425/131 |

(List continued on next page.)

FOREIGN PATENT DOCUMENTS

| 0 460 241 A1 | 12/1991 | European Pat. Off. . |
|---|---|---|
| 0 469 732 A3 | 2/1992 | European Pat. Off. . |
| 0 488 544 A1 | 6/1992 | European Pat. Off. . |
| 0 492 636 A1 | 7/1992 | European Pat. Off. . |
| 0 514 223 | 11/1992 | European Pat. Off. . |
| 0 573 905 A1 | 12/1993 | European Pat. Off. . |
| 0 597 261 A1 | 5/1994 | European Pat. Off. . |
| 0 606 939 | 7/1994 | European Pat. Off. . |
| 0 606 940 | 7/1994 | European Pat. Off. . |
| 41 21 861 A1 | 1/1992 | Germany . |
| 4-141603 | 5/1992 | Japan . |
| 4-184429 | 7/1992 | Japan . |
| 2 052 779 | 1/1981 | United Kingdom . |
| WO 94/11776 | 5/1994 | WIPO . |
| WO 94/29765 | 12/1994 | WIPO . |
| WO 95/27919 | 4/1995 | WIPO . |
| WO 95-17691 | 6/1995 | WIPO . |
| WO 95/17303 | 6/1995 | WIPO . |
| WO 95/17692 | 6/1995 | WIPO . |
| WO 95/17699 | 6/1995 | WIPO . |
| WO 96/19347 | 6/1996 | WIPO . |
| WO 97/01440 | 1/1997 | WIPO . |
| WO 97/01774 | 1/1997 | WIPO . |
| WO 97/32226 | 9/1997 | WIPO . |

OTHER PUBLICATIONS

Schrenk et al., Nanolayer polymeric optical films, Tappi Journal, pp. 169–174, Jun., 1992.
Derwent Abstract, JP 63017023.
Abstract, Japan 63–168626, 1987.
Abstract, Japan 63–168626, 1988.
Abstract, Japan 4–356038, 1992.
Alfrey, Jr., et al., "Physical Optics of Iridescent Multilayered Plastic Films", *Polymer Engineering and Science*, vol. 9, No. 6, Nov. 1969.
Radford et al., "Reflectivity of Iridescent Coextruded Multilayer Plastic Films", presented at the American Chemical Society Symposium on "Coextruded Plastic Films, Fibers, Composites", Apr. 9–14, 1972.
3M IR–Compatible Safelight Kit, Instruction Sheet 78–8063–2625–8, Jan. 1989, pp. 1–7.
3M IR Safelight Brochure, 1991.
Boese et al., "Chain Orientation and Anisotropies in Optical and Dielectric Properties in Thin Films of Stiff Polyimides", *Journal of Polymer Science, Part B: Polymer Physics*, vol. 30, p. 1321–1327 (1992).
Baba et al., "Chain anisotropy of stretched gold island films: experimental results", *Optics Letters*, vol. 17, No. 8, Apr. 15, 1992.
Weber, "Retroreflecting Sheet Polarizer", SID Conf. Proceedings, Boston, MA, May 1992, *SID 92 Digest*, pp. 427–429.
Weber, "Retroreflective Sheet Polarizer", SID Conf. Proceedings, Seattle, WA, May 1993, *SID 93 Digest*, pp. 669–672.
Hodgkinson et al., "Effective principal refractive indices and column angles for periodic stacks of thin birefringent films", *Optical Society of America*, vol. 10, No. 9, p. 2065–2071, Sep. 1993.
Zang et al., "Giant Anistropies in the Dielectric Properties of Quasi–Epitaxial Crystalline Organic Semiconductor Thin Films".

*Primary Examiner*—Vivian Chen
*Attorney, Agent, or Firm*—William D. Miller

[57] ABSTRACT

A method of forming a reflective polarizer comprising orienting a multilayer film formed from alternating layers of a first polymeric material and a second polymeric material in a first in-plane axis direction while allowing dimensional relaxation in an orthogonal second in-plane axis direction to produce specified differences in the refractive indices of the first and second polymeric materials in the first and second in-plane directions and in the thickness direction.

29 Claims, 32 Drawing Sheets

U.S. PATENT DOCUMENTS

| | | | |
|---|---|---|---|
| 3,759,647 | 9/1973 | Schrenk et al. | 425/131 |
| 3,847,585 | 11/1974 | Chrisholm | 65/99 A |
| 3,860,036 | 1/1975 | Newman, Jr. | 138/45 |
| 4,025,688 | 5/1977 | Nagy et al. | 428/350 |
| 4,190,832 | 2/1980 | Mohler | 340/705 |
| 4,268,127 | 5/1981 | Oshima et al. | 350/337 |
| 4,310,584 | 1/1982 | Cooper et al. | 428/212 |
| 4,315,258 | 2/1982 | McKnight et al. | 340/784 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,542,449 | 9/1985 | Whitehead | 362/330 |
| 4,586,790 | 5/1986 | Umeda et al. | 350/337 |
| 4,590,119 | 5/1986 | Kawakami et al. | 428/216 |
| 4,643,529 | 2/1987 | Hosonuma et al. | 350/337 |
| 4,659,523 | 4/1987 | Rogers et al. | 264/1.3 |
| 4,720,426 | 1/1988 | Englert et al. | 428/344 |
| 4,756,953 | 7/1988 | Utsumi | 428/220 |
| 4,791,540 | 12/1988 | Dreyer, Jr. et al. | 362/331 |
| 4,796,978 | 1/1989 | Tanaka et al. | 350/337 |
| 4,798,448 | 1/1989 | van Raalte | 350/345 |
| 4,799,772 | 1/1989 | Utsumi | 350/339 R |
| 4,824,882 | 4/1989 | Nakamura et al. | 524/89 |
| 4,840,463 | 6/1989 | Clark et al. | 350/350 S |
| 4,883,341 | 11/1989 | Whitehead | 350/276 R |
| 4,896,946 | 1/1990 | Suzuki et al. | 350/336 |
| 4,952,023 | 8/1990 | Bradshaw et al. | 350/102 |
| 4,974,946 | 12/1990 | Solomon | 350/399 |
| 4,989,076 | 1/1991 | Owada et al. | 358/61 |
| 5,009,472 | 4/1991 | Morimoto | 350/6.5 |
| 5,042,921 | 8/1991 | Sato et al. | 359/40 |
| 5,056,892 | 10/1991 | Cobb, Jr. | 359/831 |
| 5,059,356 | 10/1991 | Nakamura et al. | 252/585 |
| 5,093,739 | 3/1992 | Aida et al. | 359/73 |
| 5,094,788 | 3/1992 | Schrenk et al. | 264/171 |
| 5,094,793 | 3/1992 | Schrenk et al. | 264/171 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,124,841 | 6/1992 | Oishi | 359/487 |
| 5,126,880 | 6/1992 | Wheatley et al. | 359/587 |
| 5,134,516 | 7/1992 | Lehureau et al. | 350/301 |
| 5,138,474 | 8/1992 | Arakawa | 350/73 |
| 5,139,340 | 8/1992 | Okumura | 359/63 |
| 5,149,578 | 9/1992 | Wheatley et al. | 428/213 |
| 5,157,526 | 10/1992 | Kondo et al. | 359/63 |
| 5,166,817 | 11/1992 | Ota et al. | 359/73 |
| 5,188,760 | 2/1993 | Hikmet et al. | 252/299.01 |
| 5,189,538 | 2/1993 | Arakawa | 359/73 |
| 5,194,975 | 3/1993 | Akatsuka et al. | 359/73 |
| 5,200,843 | 4/1993 | Karasawa et al. | 359/40 |
| 5,202,950 | 4/1993 | Arego et al. | 385/146 |
| 5,211,878 | 5/1993 | Reiffenrath et al. | 252/299.63 |
| 5,217,794 | 6/1993 | Schrenk | 428/220 |
| 5,221,982 | 6/1993 | Faris | 359/93 |
| 5,233,465 | 8/1993 | Wheatley et al. | 359/359 |
| 5,235,443 | 8/1993 | Barnik et al. | 359/37 |
| 5,237,446 | 8/1993 | Takahashi | 350/359 |
| 5,238,738 | 8/1993 | Miller | 428/333 |
| 5,245,456 | 9/1993 | Yoshimi et al. | 359/73 |
| 5,262,894 | 11/1993 | Wheatley et al. | 359/586 |
| 5,269,995 | 12/1993 | Ramanathan et al. | 264/171 |
| 5,278,680 | 1/1994 | Karasawa et al. | 359/40 |
| 5,278,694 | 1/1994 | Wheatley et al. | 359/359 |
| 5,286,418 | 2/1994 | Nakamura et al. | 252/585 |
| 5,294,657 | 3/1994 | Melendy et al. | 524/270 |
| 5,295,018 | 3/1994 | Konuma et al. | 359/487 |
| 5,303,083 | 4/1994 | Blanchard et al. | 359/495 |
| 5,309,422 | 5/1994 | Kuroki et al. | 369/110 |
| 5,316,703 | 5/1994 | Schrenk | 264/1.3 |
| 5,319,478 | 6/1994 | Fijnfschilling et al. | 359/53 |
| 5,337,174 | 8/1994 | Wada et al. | 359/73 |
| 5,339,179 | 8/1994 | Rudisill et al. | 359/49 |
| 5,345,146 | 9/1994 | Koenck et al. | 315/169.3 |
| 5,389,324 | 2/1995 | Lewis et al. | 264/171 |
| 5,422,756 | 6/1995 | Weber | 359/487 |
| 5,448,404 | 9/1995 | Schrenk et al. | 359/584 |
| 5,451,449 | 9/1995 | Shetty et al. | 428/195 |
| 5,486,935 | 1/1996 | Kalmanash | 359/37 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |
| 5,828,488 | 10/1998 | Ouderkirk et al. | 359/487 |

PROCESS FOR FORMING REFLECTIVE POLARIZER

This application is a continuation application of U.S. application Ser. No. 08/402,041, filed Mar. 10, 1995, U.S. Pat. No. 5,882,774, which is a continuation in part of U.S. application Ser. No. 08/171,239, filed Dec. 21, 1993, abandoned, and is a continuation in part of U.S. application Ser. No. 08/359,436, filed Dec. 20, 1994, abandoned.

BACKGROUND

The present invention relates to optical films useful, e.g., as polarizers and/or mirrors.

Light-reflecting devices based upon multiple polymeric layers are known. Examples of such devices include polarizers made of alternating polymeric layers in which the layers have different refractive indices.

SUMMARY

The optical properties and design considerations of birefringent optical films described herein allow the construction of multilayer stacks for which the Brewster angle (the angle at which reflectance of p-polarized light goes to zero) is very large or is nonexistent. This allows for the construction of multilayer mirrors and polarizers whose reflectivity for p-polarized light decreases slowly with angle of incidence, are independent of angle of incidence, or increase with angle of incidence away from the normal. As a result, multilayer films having high reflectivity (for both s and p polarized light for any incident direction in the case of mirrors, and for the selected direction in the case of polarizers) over a wide bandwidth, can be achieved.

Briefly, in one aspect the present invention provides a multilayered polymer film comprising layers of a crystalline or semi-crystalline naphthalene dicarboxylic acid polyester, for example a 2,6-polyethylene naphthalate ("PEN") or a copolymer derived from ethylene glycol, naphthalene dicarboxylic acid and some other acids such as terephthalate ("co-PEN"), with a positive stress optical coefficient, i.e. upon stretching its index of refraction in the stretch direction increases, having an average thickness of not more than 0.5 microns; and layers of a selected second polymer, for example a polyethylene terephthalate ("PET") or a co-PEN, having an average thickness of not more than 0.5 microns. Preferably, after stretching of the films of this invention in at least one direction, the layers of said naphthalene dicarboxylic acid polyester have a higher index of refraction associated with at least one in-plane axis than the layers of the second polymer. The film of this invention can be used to prepare multilayer films having an average reflectivity of at least 50% over at least a 100 nm wide band.

In another aspect, the present invention provides a multilayered polymer film comprising layers of a crystalline or semi-crystalline polyester, for example a PET, having an average thickness of not more than 0.5 microns; and layers of a selected second polymer, for example a polyester or a polystyrene, having an average thickness of not more than 0.5 microns; wherein said film has been stretched in at least one direction to at least twice that direction's unstretched dimension. The film of this invention can be used to prepare multilayer films having an average reflectivity of at least 50% over at least a 100 nm wide band.

BRIEF DESCRIPTION OF THE DRAWINGS

The invention will be further explained with reference to the drawings.

DETAILED DESCRIPTION OF ILLUSTRATIVE EMBODIMENTS

Figure 1A:
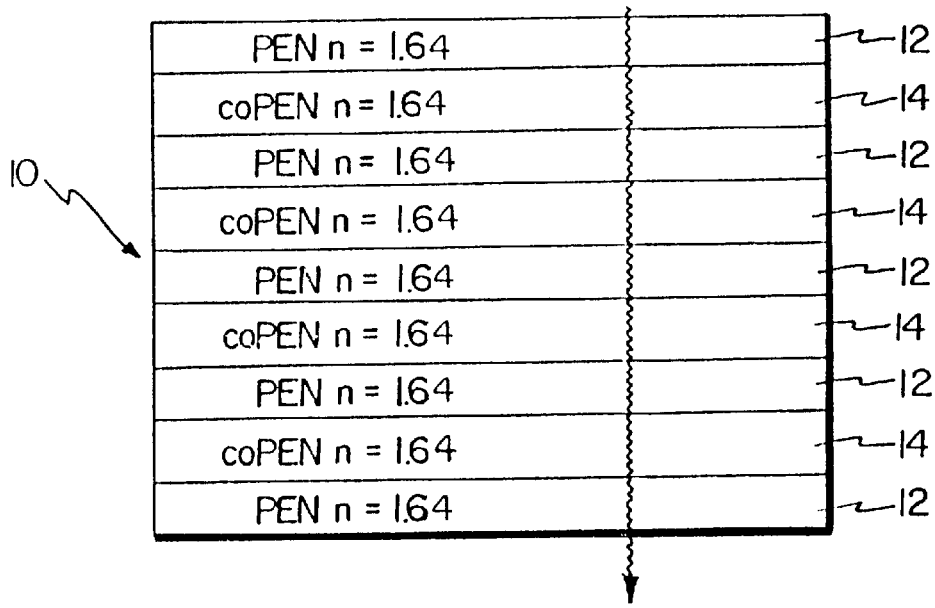
FIGS. 1a and 1b are diagrammatical views of the polarizer of the present invention.
Figure 1B:
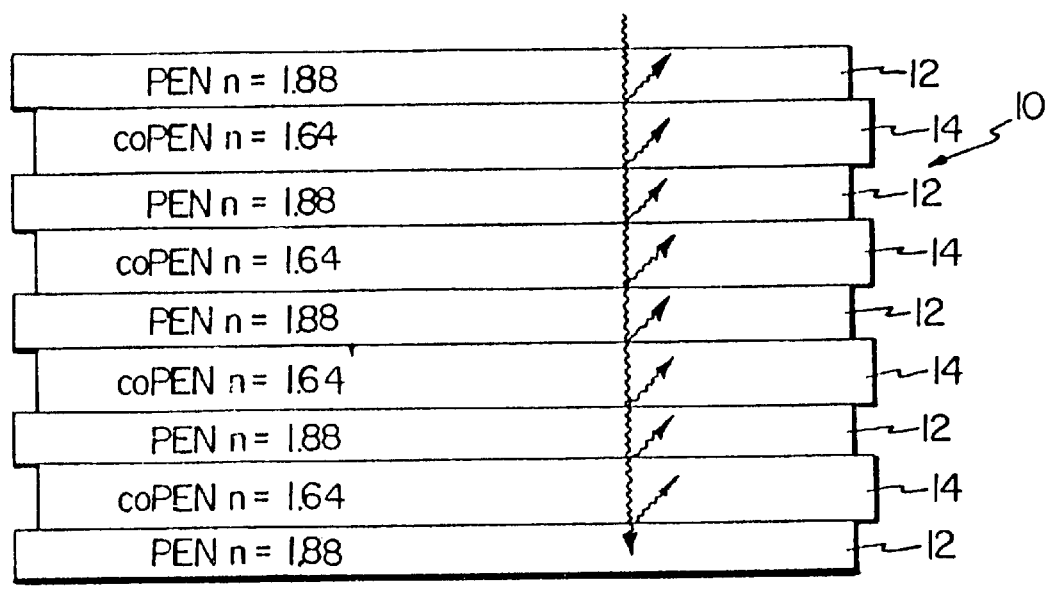

The present invention as illustrated in FIGS. 1a and 1b includes a multilayered polymeric sheet 10 having alternating layers of a crystalline naphthalene dicarboxylic acid polyester such as 2,6 polyethylene naphthalate (PEN) 12 and a selected polymer 14 useful as a reflective polarizer or mirror. By stretching PEN/selected polymer over a range of uniaxial to biaxial orientation, a film is created with a range of reflectivities for differently oriented plane-polarized incident light. If stretched biaxially, the sheet can be stretched asymmetrically along orthogonal axes or symmetrically along orthogonal axes to obtain desired polarizing and reflecting properties.

For the polarizer, the sheet is preferably oriented by stretching in a single direction and the index of refraction of the PEN layer exhibits a large difference between incident light rays with the plane of polarization parallel to the oriented and transverse directions. The index of refraction associated with an in-plane axis (an axis parallel to the surface of the film) is the effective index of refraction for plane-polarized incident light whose plane of polarization is parallel to that axis. By oriented direction is meant the direction in which the film is stretched. By transverse direction is meant that direction orthogonal in the plane of the film to the direction in which the film is oriented.

Figure 2:
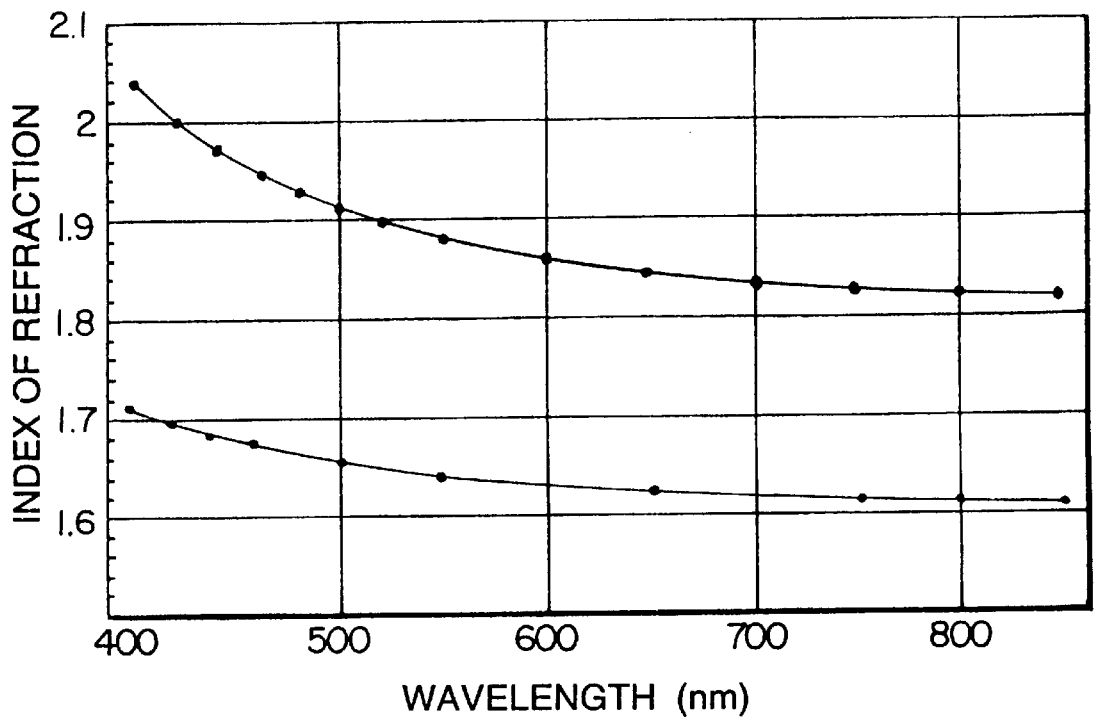
FIG. 2 is a graphical view illustrating the refractive indices characteristics of the PEN and coPEN layers of the present invention.

PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The differences in refractive indices associated with different in-plane axes exhibited by PEN and a 70-naphthalate/30-terephthalate copolyester (coPEN) for a 5:1 stretch ratio are illustrated in FIG. 2. In FIG. 2, the data on the lower curve represent the index of refraction of PEN in the transverse direction and the coPEN while the upper curve represents the index of refraction of PEN in the stretch direction. PEN exhibits a difference in refractive index of 0.25 to 0.40 in the visible spectrum. The birefringence (difference in refractive index) can be increased by increasing the molecular orientation. PEN is heat stable from about 155° C. up to about 230° C. depending upon shrinkage requirements of the application. Although PEN has been specifically discussed above as the preferred polymer for the birefringent layer, polybutylene naphthalate is also a suitable material as well as other crystalline naphthalene dicarboxylic polyesters. The crystalline naphthalene dicarboxylic polyester should exhibit a difference in refractive indices associated with different in-plane axes of at least 0.05 and preferably above 0.20.

Minor amounts of comonomers may be substituted into the naphthalene dicarboxylic acid polyester so long as the high refractive index in the stretch direction(s) is not substantially compromised. A drop in refractive index (and therefore decreased reflectivity) may be counter balanced by advantages in any of the following: adhesion to the selected polymer layer, lowered temperature of extrusion, better match of melt viscosities, better match of glass transition temperatures for stretching. Suitable monomers include those based on isophthalic, azelaic, adipic, sebacic, dibenzoic, terephthalic, 2,7-naphthalene dicarboxylic, 2,6-naphthalene dicarboxylic or cyclohexanedicarboxylic acids.

The PEN/selected polymer resins of the present invention preferably have similar melt viscosities so as to obtain uniform multilayer coextrusion. The two polymers preferably have a melt viscosity within a factor of 5 at typical shear rates.

The PEN and the preferred selected polymer layers of the present invention exhibit good adhesion properties to each other while still remaining as discrete layers within the multilayered sheet.

The glass transition temperatures of the polymers of the present invention are compatible so adverse effects such as cracking of one set of polymer layers during stretching does not occur. By compatible is meant that the glass transition temperature of the selected polymer is lower than the glass transition temperature of the PEN layer. The glass transition temperature of the selected polymer layer temperature may be slightly higher than the glass transition temperature of the PEN layer, but by no more than 40° C.

Figure 3:
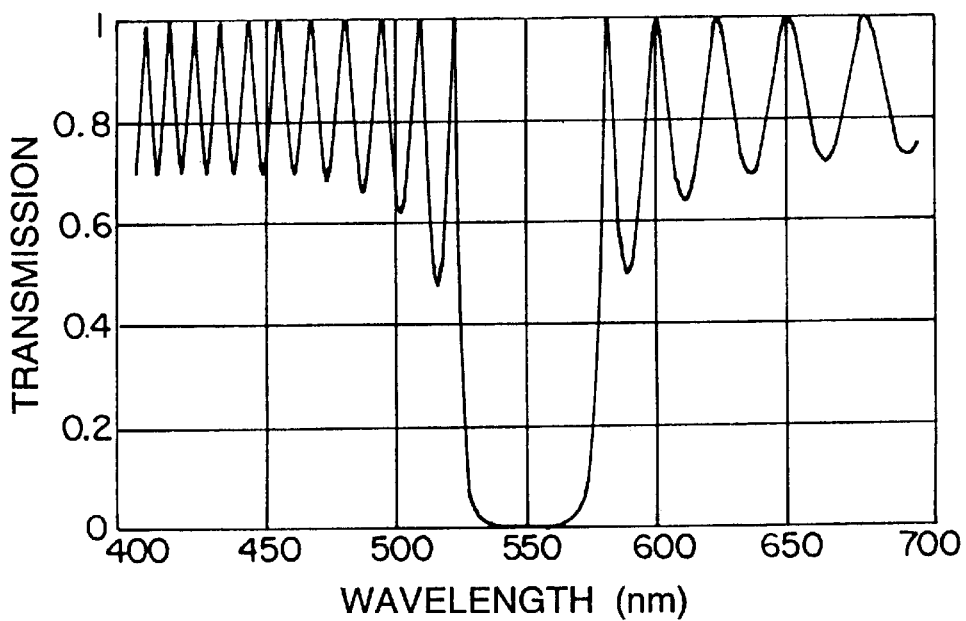
FIG. 3 is a graphical view of computer simulated data of percent transmission of a 50-layer PEN/coPEN film stack based on the indices shown in FIG. 2.
Figure 4:
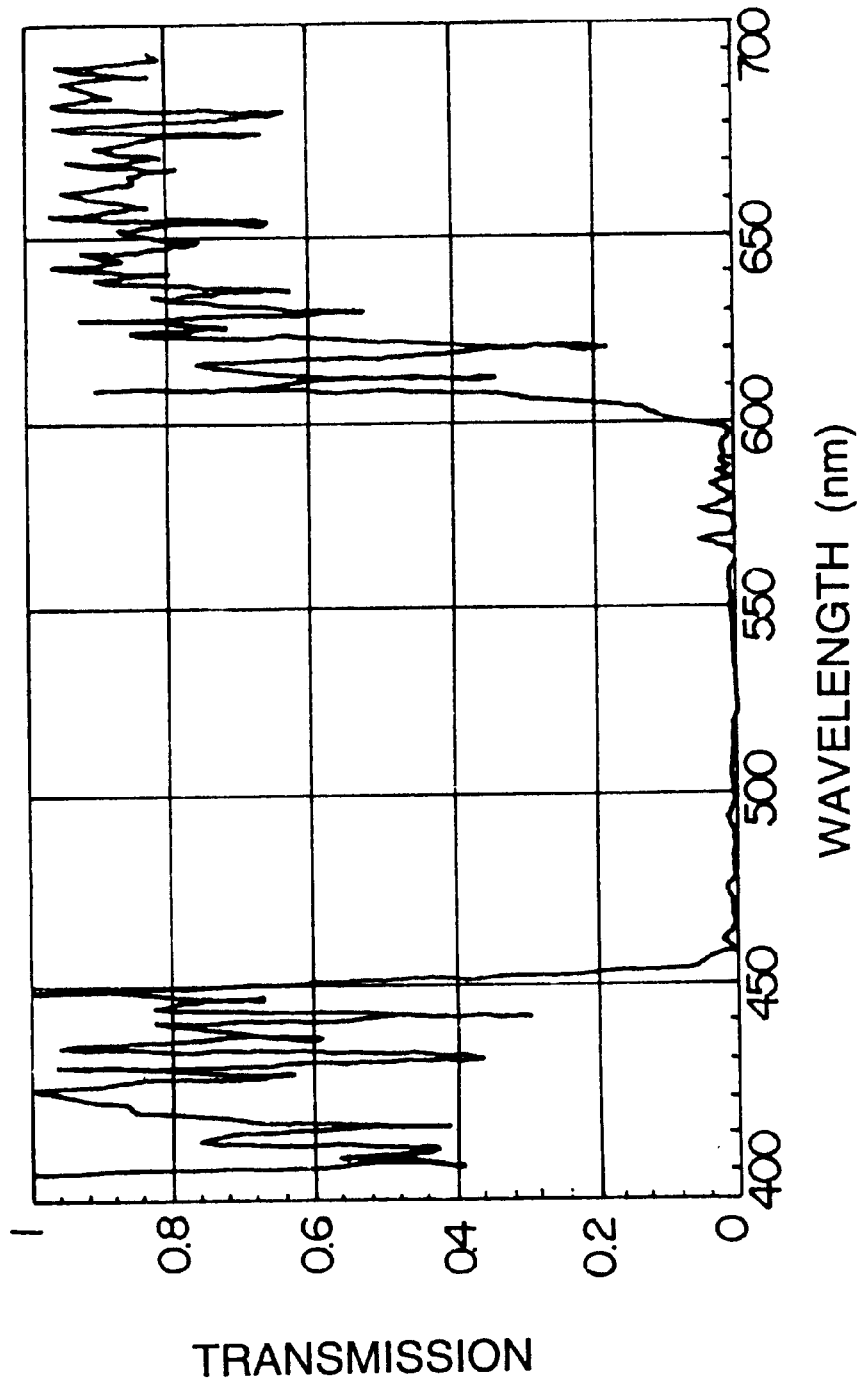
FIG. 4 is a graphical view of computer simulated data of percent transmission of an equally biaxially stretched 300-layer PEN/coPET mirror.

Preferably, the layers have a ¼ wavelength thickness with different sets of layers designed to reflect different wavelength ranges. Each layer does not have to be exactly ¼ wavelength thick. The overriding requirement is that the adjacent low-high index film pair have a total optical thickness of 0.5 wavelength. The bandwidth of a 50-layer stack of PEN/coPEN layers having the index differential indicated in FIG. 2, with layer thicknesses chosen to be a ¼ wavelength of 550 nm, is about 50 nm. This 50-layer stack provides roughly a 99 percent average reflectivity in this wavelength range with no measurable absorption. A computer-modeled curve showing less than 1 percent transmission (99 percent reflectivity) is illustrated in FIG. 3. FIGS. 3–8 include data characterized as percent transmission. It should be understood that since there is no measurable absorbance by the film of the present invention that percent reflectivity is approximated by the following relationship:

100−(percent transmission)=(percent reflectivity).

The preferred selected polymer layer 14 remains isotropic in refractive index and substantially matches the refractive index of the PEN layer associated with the transverse axis as illustrated in FIG. 1a. Light with its plane of polarization in this direction will be predominantly transmitted by the polarizer while light with its plane of polarization in the oriented direction will be reflected as illustrated in FIG. 1b.

The reflective polarizer of the present invention is useful in optical elements such as ophthalmic lenses, mirrors and windows. The polarizer is characterized by a mirror-like look which is considered stylish in sunglasses. In addition, PEN is a very good ultraviolet filter, absorbing ultraviolet efficiently up to the edge of the visible spectrum. The reflective polarizer of the present invention would also be useful as a thin infrared sheet polarizer.

For the polarizer, the PEN/selected polymer layers have at least one axis for which the associated indices of refraction are preferably substantially equal. The match of refractive indices associated with that axis, which typically is the transverse axis, results in substantially no reflection of light in that plane of polarization. The selected polymer layer may also exhibit a decrease in the refractive index associated with the stretch direction. A negative birefringence of the selected polymer has the advantage of increasing the difference between indices of refraction of adjoining layers associated with the orientation axis while the reflection of light with its plane of polarization parallel to the transverse direction is still negligible. Differences between the transverse-axis-associated indices of refraction of adjoining layers after stretching should be less than 0.05 and preferably less than 0.02. Another possibility is that the selected polymer exhibits some positive birefringence due to stretching, but this can be relaxed to match the refractive index of the transverse axis of the PEN layers in a heat treatment. The temperature of this heat treatment should not be so high as to relax the birefringence in the PEN layers.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as dimethyl terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69. Of course, the copolyester must be coextrudable with PEN. Other suitable copolyesters are based on isophthalic, azelaic, adipic, sebacic, dibenzoic, terephthalic, 2,7-naphthalene dicarboxylic, 2,6-naphthalene dicarboxylic or cyclohexanedicarboxylic acids. Other suitable variations in the copolyester include the use of ethylene glycol, propane diol, butane diol, neopentyl glycol, polyethylene glycol, tetramethylene glycol, diethylene glycol, cyclohexanedimethanol, 4-hydroxy diphenol, propane diol, bisphenol A, and 1,8-dihydroxy biphenyl, or 1,3-bis(2-hydroxyethoxy)benzene as the diol reactant. A volume average of the refractive indices of the monomers would be a good guide in preparing useful copolyesters. In addition, copolycarbonates having a glass transition temperature compatible with the glass transition temperature of PEN and with a refractive index associated with the transverse axis of approximately 1.59 to 1.69 are also useful as a selected polymer in the present invention. Formation of the copolyester or copolycarbonate by transesterification of two or more polymers in the extrusion system is another possible route to a viable selected polymer.

To make a mirror, two uniaxially stretched polarizing sheets 10 are positioned with their respective orientation axes rotated 90°, or the sheet 10 is biaxially stretched. In the latter case, both PEN refractive indices in the plane of the sheet increase and the selected polymer should be chosen with as low of a refractive index as possible to reflect light of both planes of polarization. Biaxially stretching the multilayered sheet will result in differences between refractive indices of adjoining layers for planes parallel to both axes thereby resulting in reflection of light in both planes of polarization directions. Biaxially stretching PEN will increase the refractive indices associated with those axes of elongation from 1.64 to only 1.75, compared to the uniaxial value of 1.9. Therefore to create a dielectric mirror with 99 percent reflectivity (and thus with no noticeable iridescence) a low refractive index coPET is preferred as the selected polymer. Optical modeling indicates this is possible with an index of about 1.55. A 300-layer film with a 5 percent standard deviation in layer thickness, designed to cover half of the visible spectrum with six overlapping quarterwave stacks, has the predicted performance shown in FIG. 4. A greater degree of symmetry of stretching yields an article that exhibits relatively more symmetric reflective properties and relatively less polarizing properties.

If desired, two or more sheets of the invention may be used in a composite to increase reflectivity, optical band width, or both. If the optical thicknesses of pairs of layers within the sheets are substantially equal, the composite will reflect, at somewhat greater efficiency, substantially the same band width and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic or cyclohexanedicarboxylic acid to attain the lowest possible refractive index while still maintaining adhesion to the PEN layers. Naphthalene dicarboxylic acid may still be employed in minor amounts to improve the adhesion to PEN. The diol component may be taken from any that have been previously mentioned. Preferably the selected polymer has an index of refraction of less than 1.65 and more preferably an index of refraction of less than 1.55.

It is not required that the selected polymer be a copolyester or copolycarbonate. Vinyl polymers and copolymers made from monomers such as vinyl naphthalenes, styrenes, ethylene, maleic anhydride, acrylates, methacrylates, might be employed. Condensation polymers other than polyesters and polycarbonates might also be useful, examples include: polysulfones, polyamides, polyurethanes, polyamic acids, polyimides. Naphthalene groups and halogens such as chlorine, bromine and iodine are useful in increasing the refractive index of the selected polymer to the desired level (1.59 to 1.69) to substantially match the refractive index of PEN associated with the transverse direction for a polarizer. Acrylate groups and fluorine are particularly useful in decreasing refractive index for use in a mirror.

Figure 9:
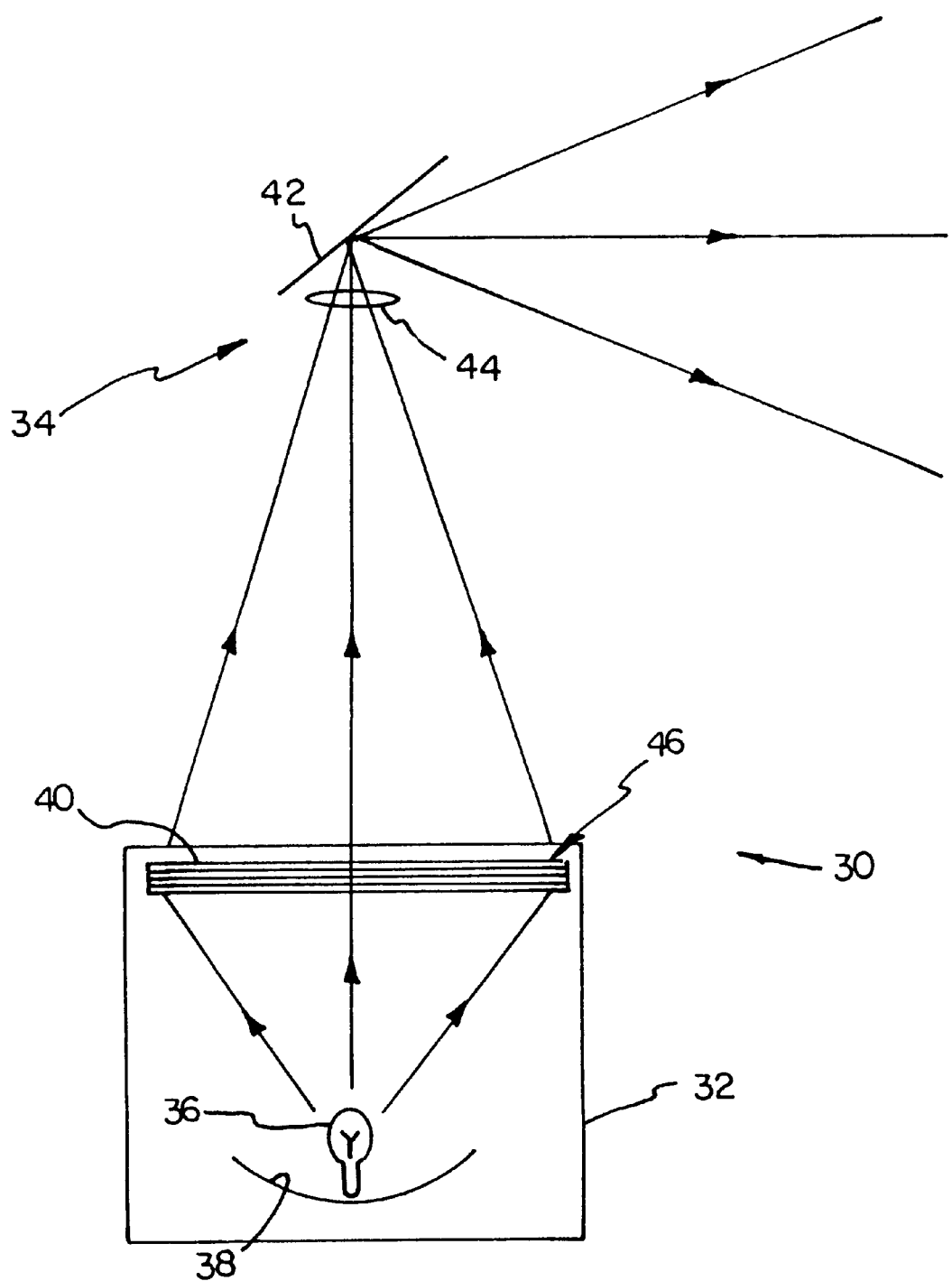
FIG. 9 is a schematic view of an overhead projector of the present invention.

FIG. 9 illustrates the use of the present invention as a hot mirror in an overhead projector 30. The projector 30 is a transmissive-type projector, and has many features of a conventional overhead projector, including a base 32 and a projection head 34. The projection head 34 is attached to the base 32 by an arm (not shown), which may be raised or lowered thereby moving the head 34 toward or away from the base 32, by conventional adjustment means. The base 32 includes a light source 36, a power supply (not shown) for the light source 36, and appropriate optical components such as a mirror 38 for directing the light toward a projection stage area 40. The stage area 40 in a conventional overhead projector includes a transparent sheet such as glass typically having at least one fresnel lens integrally formed therein for focusing light toward the head 34. If a transparency having a visual image is placed on the stage 40, the image is collected and projected such as to a nearby projection screen or surface by conventional optics such as a mirror 42 and lens 44 located within the head 34.

A mirror 46 of the present invention is advantageously used in the overhead projector 30 to reflect the heat-producing infrared energy from the light source 36 while transmitting visible light. When used to reflect infrared energy, the mirror 46 is used as a hot mirror. This is especially important for incandescent light sources where about 85 percent of the emitted energy is in the infrared wavelength. The infrared energy, if uncontrolled, can cause excessive heating of dense transparencies or LCD projection panels that are placed on the projection stage 40. When used as a hot mirror, the mirror 46 is normally positioned between the light source 36 and the projection stage 40. The mirror 46 can be a separate element or the mirror can be applied to an optical component as a coating in the light path between the light source and the projection stage.

Alternatively, the mirror 46 can be used in the overhead projector 30 as a cold mirror, that is a mirror that reflects visible light, while transmitting infrared energy. The mirror of the present invention may also be positioned as a folding mirror (not shown) between the light source 36 and the projection stage 40. Reflectance of a multilayer cold mirror can easily approach 95 percent for visible light. The mirror of the present invention can be applied as a cold mirror coating to a spherical concave reflector such as reflector 38 that is placed behind the light source 36 to collect and redirect visible light emitted from the light source while transmitting infrared energy.

Orientation of the extruded film was done by stretching individual sheets of the material in heated air. For economical production, stretching may be accomplished on a continuous basis in a standard length orienter, tenter oven, or both. Economies of scale and line speeds of standard polymer film production may be achieved thereby achieving manufacturing costs that are substantially lower than costs associated with commercially available absorptive polarizers.

Lamination of two or more sheets together is advantageous, to improve reflectivity or to broaden the bandwidth, or to form a mirror from two polarizers. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the sheets 10, optical clarity and exclusion of air being the primary guiding principles.

It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

Optical Behavior and Design Considerations of Multilayer Stacks

The optical behavior of a multilayer stack 10 such as that shown above in FIGS. 1a and 1b will now be described in more general terms.

The optical properties and design considerations of multilayer stacks described below allow the construction of multilayer stacks for which the Brewster angle (the angle at which reflectance goes to zero) is very large or is nonexistant. This allows for the construction of multilayer mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The average transmission at normal incidence for a multilayer stack, (for light polarized in the plane of the extinction axis in the case of polarizers, or for both polarizations in the case of mirrors), is desirably less than 50% (reflectivity of 0.5) over the intended bandwidth. (It shall be understood that for the purposes of the present application, all transmission or reflection values given include front and back surface reflections). Other multilayer stacks exhibit lower average transmission and/or a larger intended bandwidth, and/or over a larger range of angles from the normal. If the intended bandwidth is to be centered around one color only, such as red, green or blue, each of which has an effective bandwidth of about 100 nm each, a multilayer stack with an average transmission of less than 50% is desirable. A multilayer stack having an average transmission of less than 10% over a bandwidth of 100 nm is also preferred. Other exemplary preferred mudilayer stacks have an average transmission of less than 30% over a bandwidth of 200 nm. Yet another preferred multilayer stack exhibits an average transmission of less than 10% over the bandwidth of the visible spectrum (400–700 nm). Most preferred is a multilayer stack that exhibits an average transmission of less than 10% over a bandwidth of 380 to 740 nm. The extended bandwidth is useful even in visible light applications in order to accommodate spectral shifts with angle, and variations in the multilayer stack and overall film caliper.

The multilayer stack 10 can include tens, hundreds or thousands of layers, and each layer can be made from any of a number of different materials. The characteristics which determine the choice of materials for a particular stack depend upon the desired optical performance of the stack.

The stack can contain as many materials as there are layers in the stack. For ease of manufacture, preferred optical thin film stacks contain only a few different materials. For purposes of illustration, the present discussion will describe multilayer stacks including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Several parameters may affect the maximum reflectivity achievable in any multilayer stack. These include basic stack design, optical absorption, layer thickness control and the relationship between indices of refraction of the layers in the stack. For high reflectivity and/or sharp bandedges, the basic stack design should incorporate optical interference effects using standard thin film optics design. This typically involves using optically thin layers, meaning layers having an optical thickness in the range of 0.1 to 1.0 times the wavelength of interest. The basic building blocks for high reflectivity multilayer films are low/high index pairs of film layers, wherein each low/high index pair of layers has a combined optical thickness of ½ the center wavelength of the band it is designed to reflect. Stacks of such films are commonly referred to as quarterwave stacks.

To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to tune the multilayer stack such that the "blue" layers are on the incident side of the multilayer stack.

A multilayer construction of alternative low and high index thick films, often referred to as a "pile of plates", has no tuned wavelengths nor bandwidth constraints, and no wavelength is selectively reflected at any particular layer in the stack. With such a construction, the blue reflectivity suffers due to higher penetration into the stack, resulting in higher absorption than for the preferred quarterwave stack design. Arbitrarily increasing the number of layers in a "pile of plates" will not always give high reflectivity, even with zero absorption. Also, arbitrarily increasing the number of layers in any stack may not give the desired reflectivity, due to the increased absorption which would occur.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG. 10, the reflectivity as a function of angle of incidence for s and p polarized light for a plane of incidence including the z-axis and one in-plane optic axis will be plotted.

Figure 10:
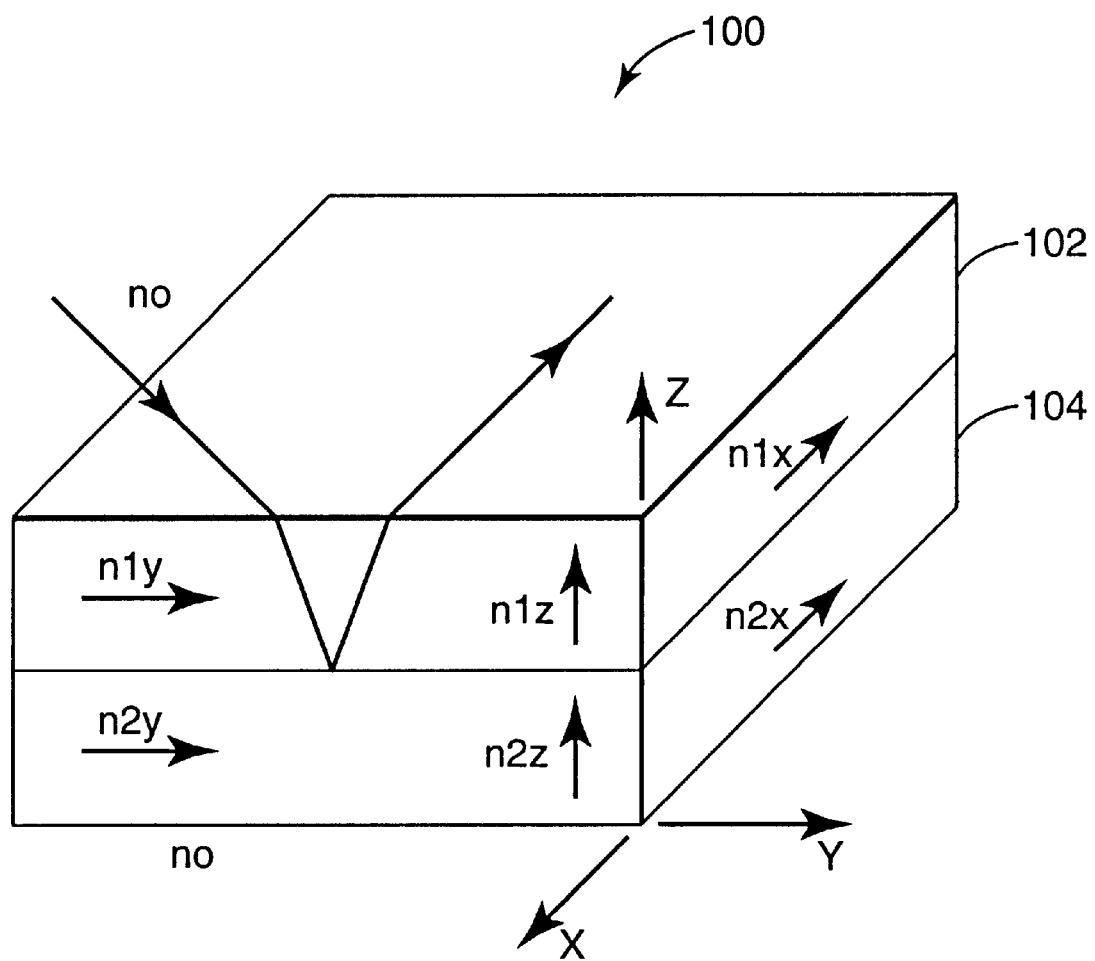
FIG. 10 shows a two layer stack of films forming a single interface.

FIG. 10 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any film stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$r_{pp} = \frac{n2z * n2o\sqrt{(n1z2 - no2\sin 2\theta)} - n1z * n1o\sqrt{(n2z2 - no2\sin 2\theta)}}{n2z * n2o\sqrt{(n1z2 - no2\sin 2\theta)} + n1z * n1o\sqrt{(n2z2 - no2\sin 2\theta)}} \quad 1)$$

$$r_{ss} = \frac{\sqrt{(n1o2 - no2\sin 2\theta)} - \sqrt{(n2o2 - no2\sin 2\theta)}}{\sqrt{(n1o2 - no2\sin 2\theta)} + \sqrt{(n2o2 - no2\sin 2\theta)}} \quad 2)$$

where θ is measured in the isotropic medium.

In a uniaxial birefringent system, n1x=n1y=n1o, and n2x=n2y=n2o.

For a biaxial birefringent system, equations 1 and 2 are valid only for light with its plane of polarization parallel to the x-z or y-z planes, as defined in FIG. 10. So, for a biaxial system, for light incident in the x-z plane, n1o=n1x and n2o=n2x in equation 1 (for p-polarized light), and n1o=n1y and n2o=n2y in equation 2 (for s-polarized light). For light incident in the y-z plane, n1o=n1y and n2o=n2y in equation 1 (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x or y axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny≠nz. The x and y axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx≠ny≠nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

Uniaxial Birefringent Systems (Mirrors)

The optical properties and design considerations of uniaxial birefringent systems will now be discussed. As discussed above, the general conditions for a uniaxial birefringent material are nx=ny≠nz. Thus if each layer 102 and 104 in FIG. 10 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400–700 nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Equation 1 described above can be used to determine the reflectivity of a single interface in a uniaxial birefringent system composed of two layers such as that shown in FIG. 10. Equation 2, for s polarized light, is identical to that of the case of isotropic films (nx=ny=nz), so only equation 1 need be examined. For purposes of illustration, some specific, although generic, values for the film indices will be assigned. Let n1x=n1y=1.75, n1z=variable, n2x=n2y=1.50, and n2z=variable. In order to illustrate various possible Brewster angles in this system, no=1.60 for the surrounding isotropic media.

Figure 11:
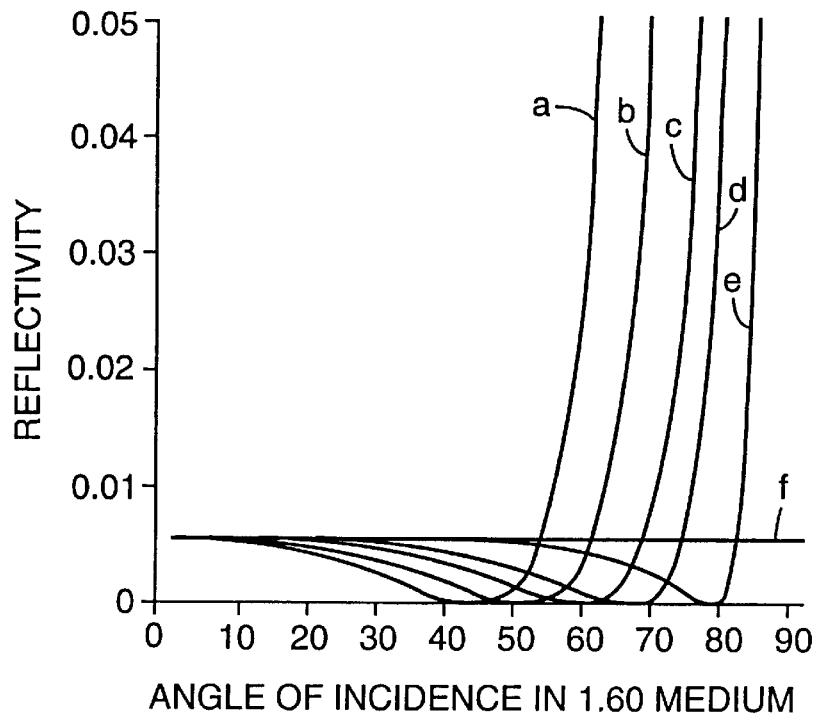
FIGS. 11 and 12 show reflectivity versus angle curves for a uniaxial birefringent system in a medium of index 1.60.

FIG. 11 shows reflectivity versus angle curves for p-polarized light incident from the isotropic medium to the birefringent layers, for cases where n1z is numerically greater than or equal to n2z (n1z≧n2z). The curves shown FIG. 11 are for the following z-index values: a) n1z=1.75, n2z=1.50; b) n1z=1.75, n2z=1.57; c) n1z=1.70, n2z=1.60; d) n1z=1.65, n2z=1.60; e) n1z=1.61, n2z=1.60; and f) n1z=1.60=n2z. As n1z approaches n2z, the Brewster angle, the angle at which reflectivity goes to zero, increases. Curves a–e are strongly angular dependent. However, when n1z=n2z (curve f), there is no angular dependence to reflectivity. In other words, the reflectivity for curve f is constant for all angles of incidence. At that point, equation 1 reduces to the angular independent form: (n2o−n1o)/(n2o+n1o). When n1z=n2z, there is no Brewster effect and there is constant reflectivity for all angles of incidence.

Figure 12:
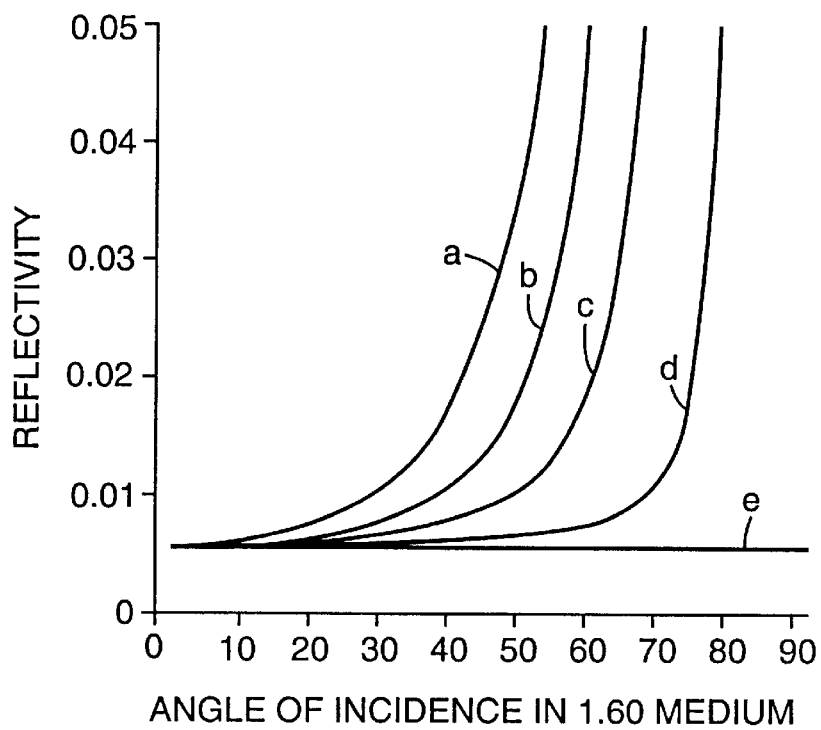

FIG. 12 shows reflectivity versus angle of incidence curves for cases where n1z is numerically less than or equal to n2z. Light is incident from isotropic medium to the birefringent layers. For these cases, the reflectivity monotonically increases with angle of incidence. This is the behavior that would be observed for s-polarized light. Curve a in FIG. 12 shows the single case for s polarized light. Curves b–e show cases for p polarized light for various values of nz, in the following order: b) n1z=1.50, n2z=1.60; c) n1z=1.55, n2z=1.60; d) n1z=1.59, n2z=1.60; and e) n1z=1.60=n2z. Again, when n1z=n2z (curve e), there is no Brewster effect, and there is constant reflectivity for all angles of incidence.

Figure 13:
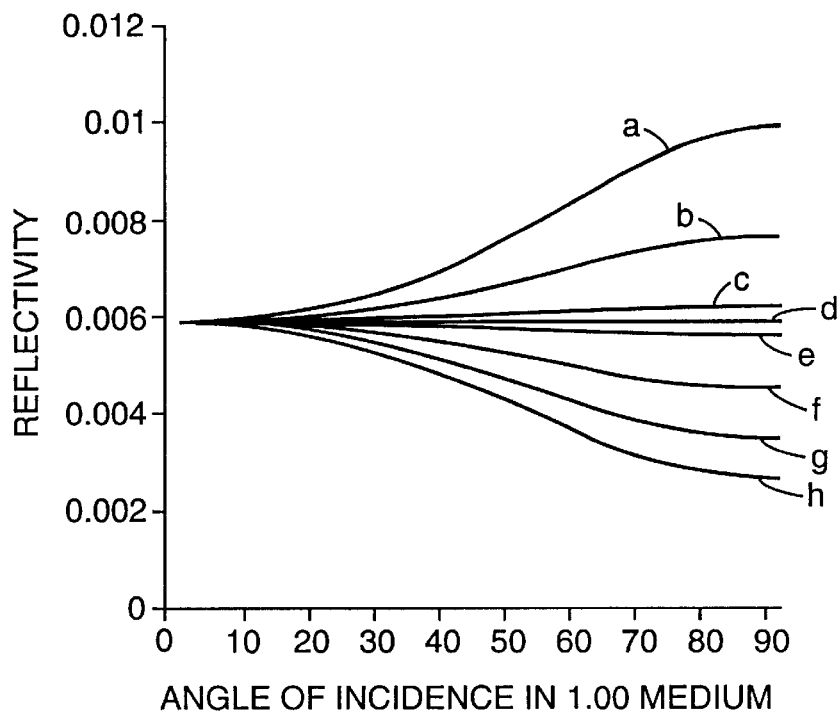
FIG. 13 shows reflectivity versus angle curves for a uniaxial birefringent system in a medium of index 1.0.

FIG. 13 shows the same cases as FIGS. 11 and 12 but for an incident medium of index no=1.0 (air). The curves in FIG. 13 are plotted for p polarized light at a single interface of a positive uniaxial material of indices n2x=n2y=1.50, n2z=1.60, and a negative uniaxially birefringent material with n1x=n1y=1.75, and values of n1z, in the following order, from top to bottom, of: a) 1.50; b) 1.55; c) 1.59; d) 1.60; f) 1.61; g) 1.65; h) 1.70; and i) 1.75. Again, as was shown in FIGS. 11 and 12, when the values of n1z and n2z match (curve d), there is no angular dependence to reflectivity.

FIGS. 11, 12 and 13 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 14:
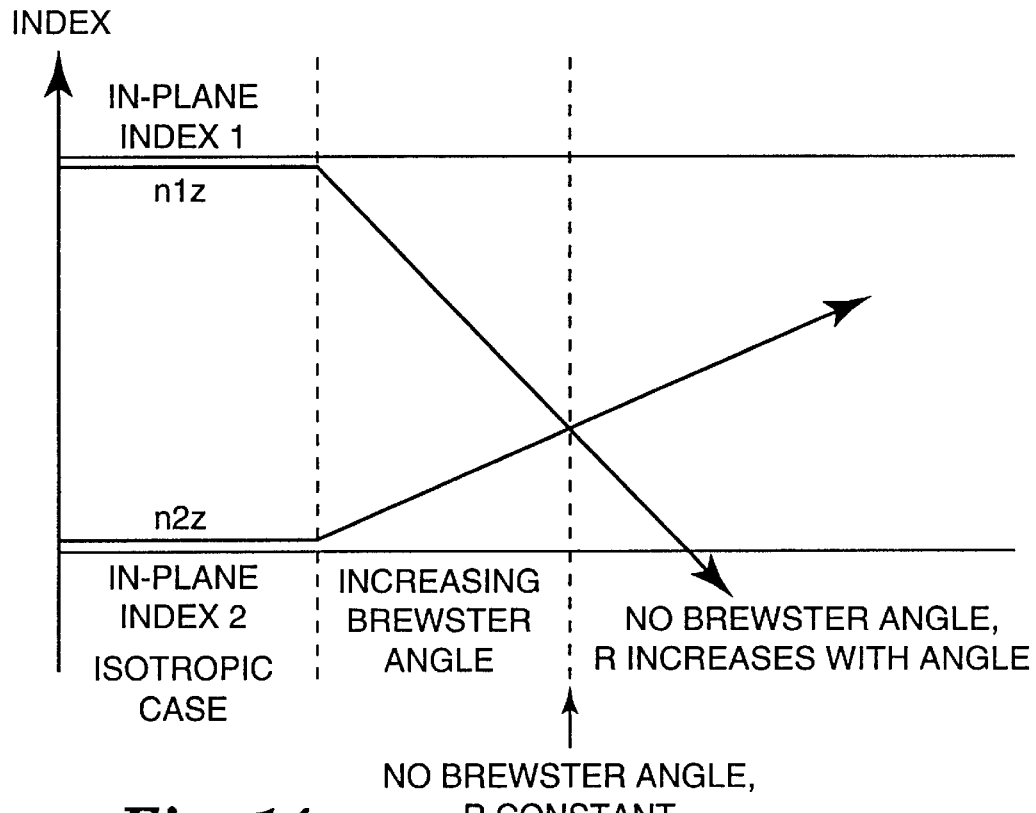
FIGS. 14, 15 and 16 show various relationships between in-plane indices and z-index for a uniaxial birefringent system.
Figure 15:
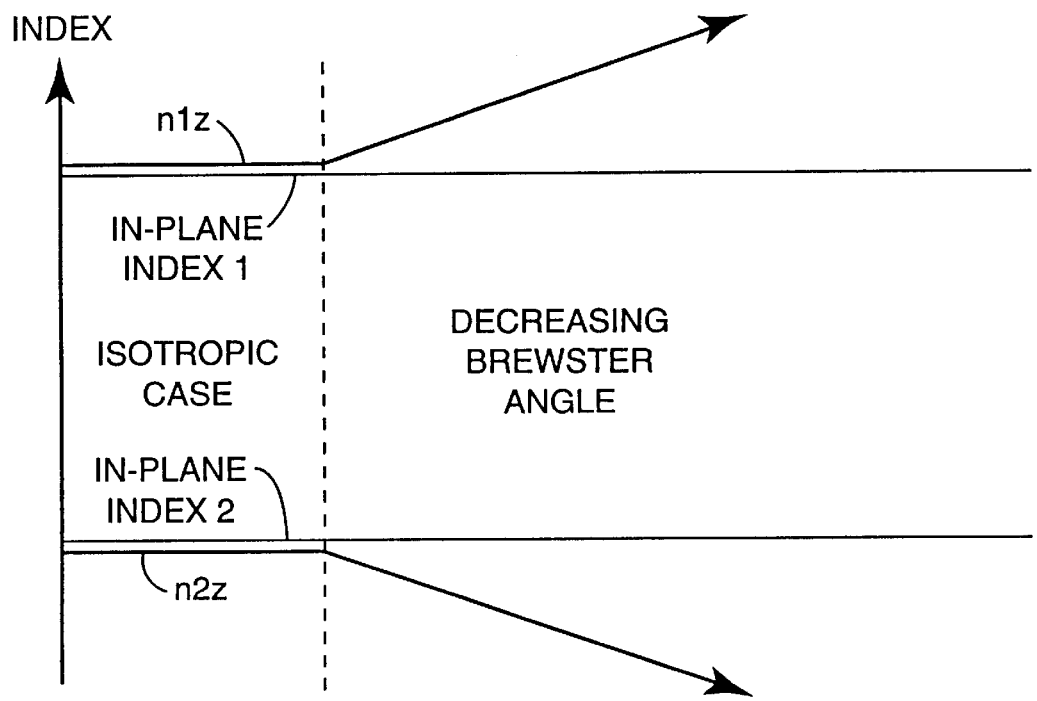
Figure 16:
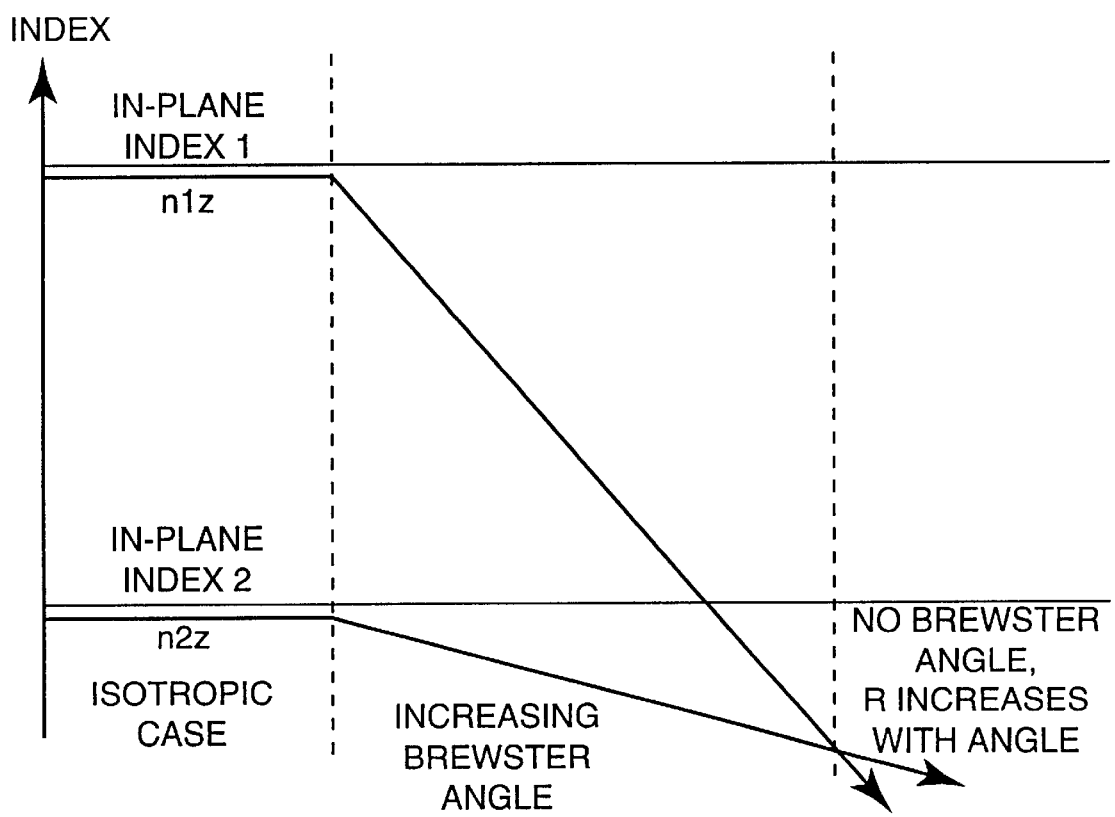

Various possible relationships between in-plane indices and z-axis indices are illustrated in FIGS. 14, 15 and 16. The vertical axes indicate relative values of indices and the horizontal axes are used to separate the various conditions. Each Figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 11, 12, and 13 is illustrated in FIG. 14. The in-plane indices of material one are greater than the in-plane indices of material two, material 1 has negative birefringence (n1z less than in-plane indices), and material two has positive birefringence (n2z greater than in-plane indices). The point at which the Brewster angle disappears and reflectivity is constant for all angles of incidence is where the two z-axis indices are equal. This point corresponds to curve f in FIG. 11, curve e in FIG. 12 or curve d in FIG. 13.

In FIG. 15, material one has higher in-plane indices than material two, but material one has positive birefringence and material two has negative birefringence. In this case, the Brewster minimum can only shift to lower values of angle.

Both FIGS. 14 and 15 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 16 shows the case where both films have negative birefringence. However, it shall be understood that the case of two positive birefringent layers is analogous to the case of two negative birefringent layers shown in FIG. 16. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 14–16, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

Biaxial Birefringent Systems (Polarizers)

Referring again to FIG. 10, two component orthogonal biaxial birefringent systems and the design considerations affecting the resultant optical properties will now be described. Again, the system can have many layers, but an understanding of the optical behavior of the stack is achieved by examining the optical behavior at one interface.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 10, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88−1.65=0.23 in a multilayer stack with hundreds of layers will yield very high reflectivities for s-polarized light. For p-polarized light the reflectance at various angles depends on the n1z/n2z index differential.

In many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrow bandpolarizer across a 100 nm bandwidth is desirably at least 50%, preferably at least 70% and more preferably at least 90%. The average transmission at 60 degreees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis) for a polarizer from 400–700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} \left((T - \overline{T})^2\right)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is describe to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios $\Delta ny/\Delta nx$ and $\Delta nz/\Delta nx$ should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio $\Delta nz/\Delta nx$ is 0, but ratios of less than 0.25 or 0.5 also produce a useable polarizer.

Figure 17:
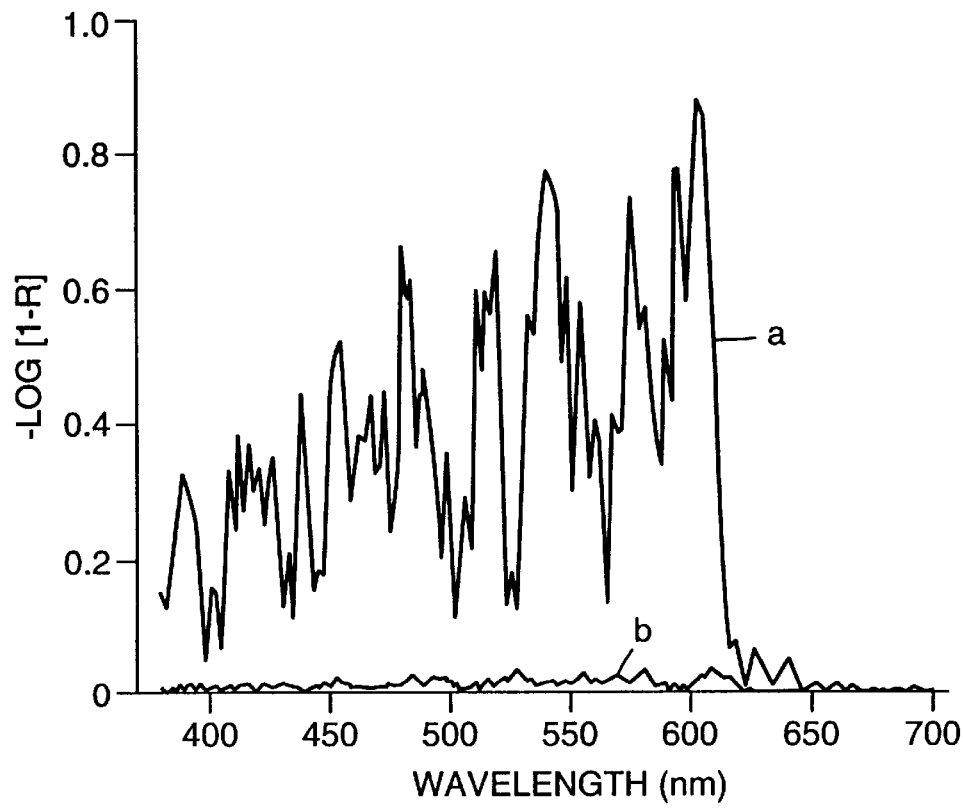
FIG. 17 shows off axis reflectivity versus wavelength for two different biaxial birefringent systems.

FIG. 17 shows the reflectivity (plotted as −Log[1-R]) at 75° for p polarized light with its plane of incidence in the non-stretch direction, for an 800 layer stack of PEN/coPEN. The reflectivity is plotted as function of wavelength across the visible spectrum (400–700 nm). The relevant indices for curve a at 550 nm are n1y=1.64, n1z=1.52, n2y=1.64 and n2z=1.63. The model stack design is a linear thickness grade for quarterwave pairs, where each pair thickness is given by dn=do+do(0.003)n. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch ($\Delta nz=0.11$). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 18:
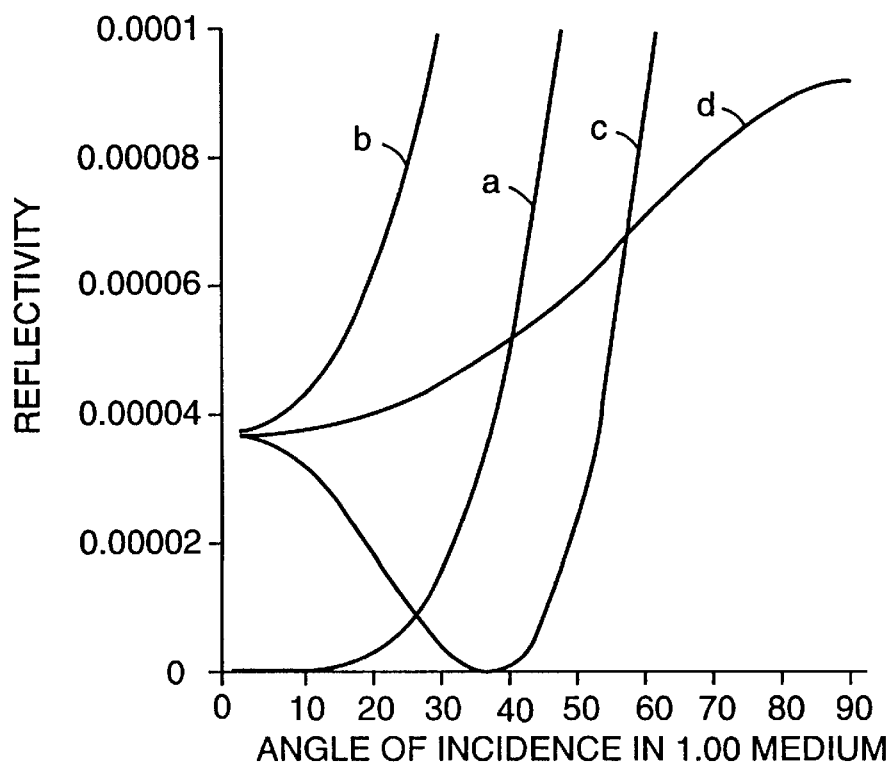
FIG. 18 shows the effect of introducing a y-index difference in a biaxial birefringent film with a large z-index difference.

FIG. 18 explores the effect of introducing a y-index mismatch in reducing off-axis reflectivity along the transmission axis of a biaxial birefringent system. With n1z=1.52 and n2z=1.63 ($\Delta nz=0.11$), the following conditions are plotted for p polarized light: a) n1y=n2y=1.64; b) n1y=1.64, n2y=1.62; c) n1y=1.64, n2y=1.66. Curve a shows the reflectivity where the in-plane indices n1y and n2y are equal. Curve a has a reflectance minimum at 0°, but rises steeply after 20°. For curve b, n1y>n2y, and reflectivity increases rapidly. Curve c, where n1y<n2y, has a reflectance minimum at 38°, but rises steeply thereafter. Considerable reflection occurs as well for s polarized light for n1y≠n2y, as shown by curve d. Curves a–d of FIG. 18 indicate that the sign of the y-index mismatch (n1y–n2y) should be the same as the z-index mismatch (n1z–n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 13 indicates that the extinction axis will still have a high reflectivity off-angle as it does at normal incidence, and no reflection would occur along the non-stretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index as described below in Example 15. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 19:
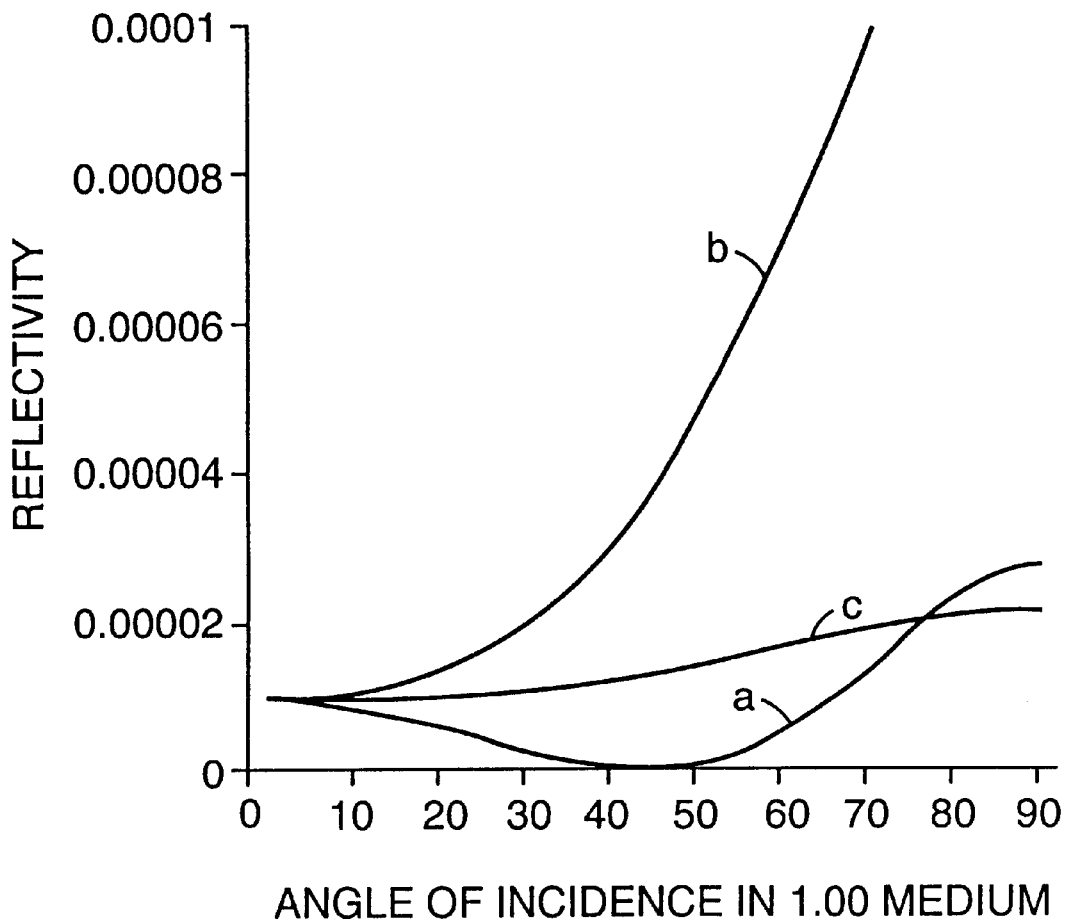
FIG. 19 shows the effect of introducing a y-index difference in a biaxial birefringent film with a smaller z-index difference.

Another example is plotted in FIG. 19, assuming n1z= 1.56 and n2z=1.60 ($\Delta nz=0.04$), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 19 is plotted as curve b in FIG. 17. Comparison of curve b with curve a in FIG. 17 shows that there is far less off-axis reflectivity, and therefore lower perceived color and better uniformity, for the conditions plotted in curve b. The relevant indices for curve b at 550 nm are n1y=1.64, n1z=1.56, n2y=1.65 and n2z=1.60.

Figure 20:
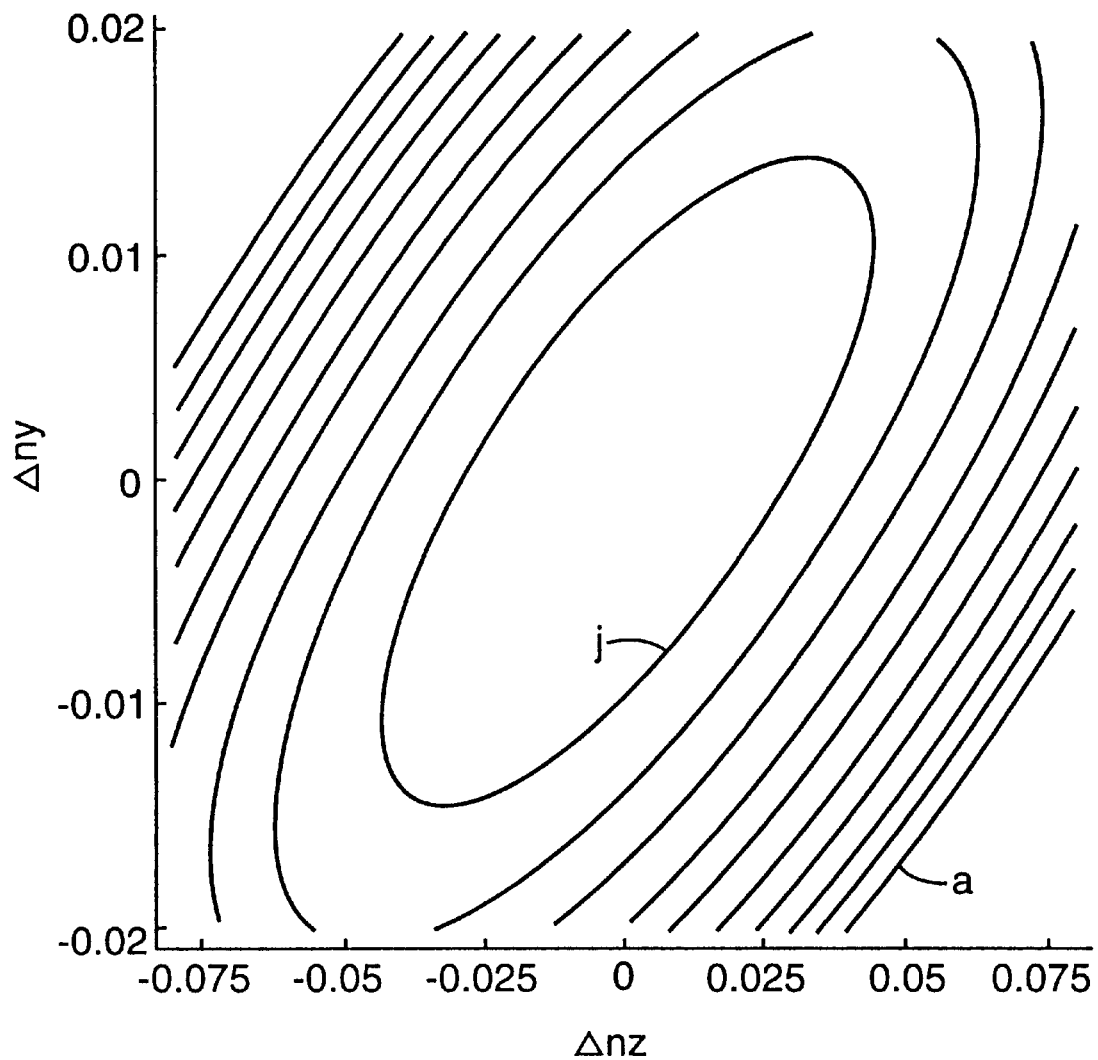
FIG. 20 shows a contour plot summarizing the information from FIGS. 18 and 19.

FIG. 20 shows a contour plot of equation 1 which summarizes the off axis reflectivity discussed in relation to FIG. 10 for p-polarized light. The four independent indices involved in the non-stretch direction have been reduced to two index mismatches, $\Delta nz$ and $\Delta ny$. The plot is an average of 6 plots at various angles of incidence from 0° to 75° in 15 degree increments. The reflectivity ranges from $0.4 \times 10^{-4}$ for contour a, to $4.0 \times 10^{-4}$ for contour j, in constant increments of $0.4 \times 10^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

It should also be noted that narrow band polarizers operating over a narrow wavelength range can also be designed using the principles described herein. These can be made to produce polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to dereflect a film of index 1.64 for PEN based polarizers in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials).

Materials Selection and Processing

With the above-described design considerations established, one of ordinary skill will readily appreciate that a wide variety of materials can be used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of mirrors include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from 3M Co.

The number of layers in the device is selected to achieve the desired optical properties using the minimum number of layers for reasons of film thickness, flexibility and economy.

In the case of both polarizers and mirrors, the number of layers is preferably less than 10,000, more preferably less than 5,000, and (even more preferably) less than 2,000.

As discussed above, the ability to achieve the desired relationships among the various indices of refraction (and thus the optical properties of the multilayer device) is influenced by the processing conditions used to prepare the multilayer device. In the case of organic polymers which can be oriented by stretching, the devices are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirrors the film is stretched substantially in two directions (biaxial orientation).

The film may be allowed to dimensionally relax in the cross-stretch direction from the natural reduction in cross-stretch (equal to the square root of the stretch ratio) to being constrained (i.e., no substantial change in cross-stretch dimensions). The film may be stretched in the machine direction, as with a length orienter, in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratios in the range from 1:2 to 1:10 (more preferably 1:3 to 1:7) in the stretch direction and from 1:0.5 to 1:10 (more preferably from 1:0.5 to 1:7) orthogonal to the stretch direction is preferred.

Suitable multilayer devices may also be prepared using techniques such as spin coating (e.g., as described in Boese et al., J. Polym. Sci.: Part B, 30: 1321 (1992) for birefringent polyimides, and vacuum deposition (e.g., as described by Zang et. al., Appl. Phys. Letters, 59: 823 (1991) for crystalline organic compounds; the latter technique is particularly useful for certain combinations of crystalline organic compounds and inorganic materials.

The invention will now be described by way of the following examples. In the examples, because optical absorption is negligible, reflection equals 1 minus transmission (R=1−T).

EXAMPLE 1 (Polarizer)

PEN and a 70 naphthalate/30 terephthalate copolyester (coPEN) were synthesized in a standard polyester resin kettle using ethylene glycol as the diol. The intrinsic viscosity of both the PEN and the coPEN was approximately 0.6 dl/g. Single layer films of PEN and coPEN were extruded and then uniaxially stretched, with the sides restrained, at approximately 150° C. As extruded, the PEN exhibited an isotropic refractive index of about 1.65, and the coPEN was characterized by an isotropic refractive index of about 1.64. By isotropic is meant that the refractive indices associated with all axes in the plane of the film are substantially equal. Both refractive index values were observed at 550 nm. After stretching at a 5:1 stretch ratio, the refractive index of the PEN associated with the oriented axis increased to approximately 1.88. The refractive index associated with the transverse axis dropped slightly to 1.64. The refractive index of the coPEN film after stretching at a 5:1 stretch ratio remained isotropic at approximately 1.64.

A satisfactory multilayer polarizer was then made of alternating layers of PEN and coPEN by coextrusion using a 51-slot feed block which fed a standard extrusion die. The extrusion was run at approximately 295° C. The PEN was extruded at approximately 23 lb/hr and the coPEN was extruded at approximately 22.3 lb/hr. The PEN skin layers were approximately three times as thick as the layers within the extruded film stack. All internal layers were designed to have an optical ¼ wavelength thickness for light of about 1300 nm. The 51-layer stack was extruded and cast to a thickness of approximately 0.0029 inches, and then uniaxially stretched with the sides restrained at approximately a 5:1 stretch ratio at approximately 150° C. The stretched film had a thickness of approximately 0.0005 inches.

The stretched film was then heat set for 30 seconds at approximately 230° C. in an air oven. The optical spectra were essentially the same for film that was stretched and for film that was subsequently heat set.

Figure 5:
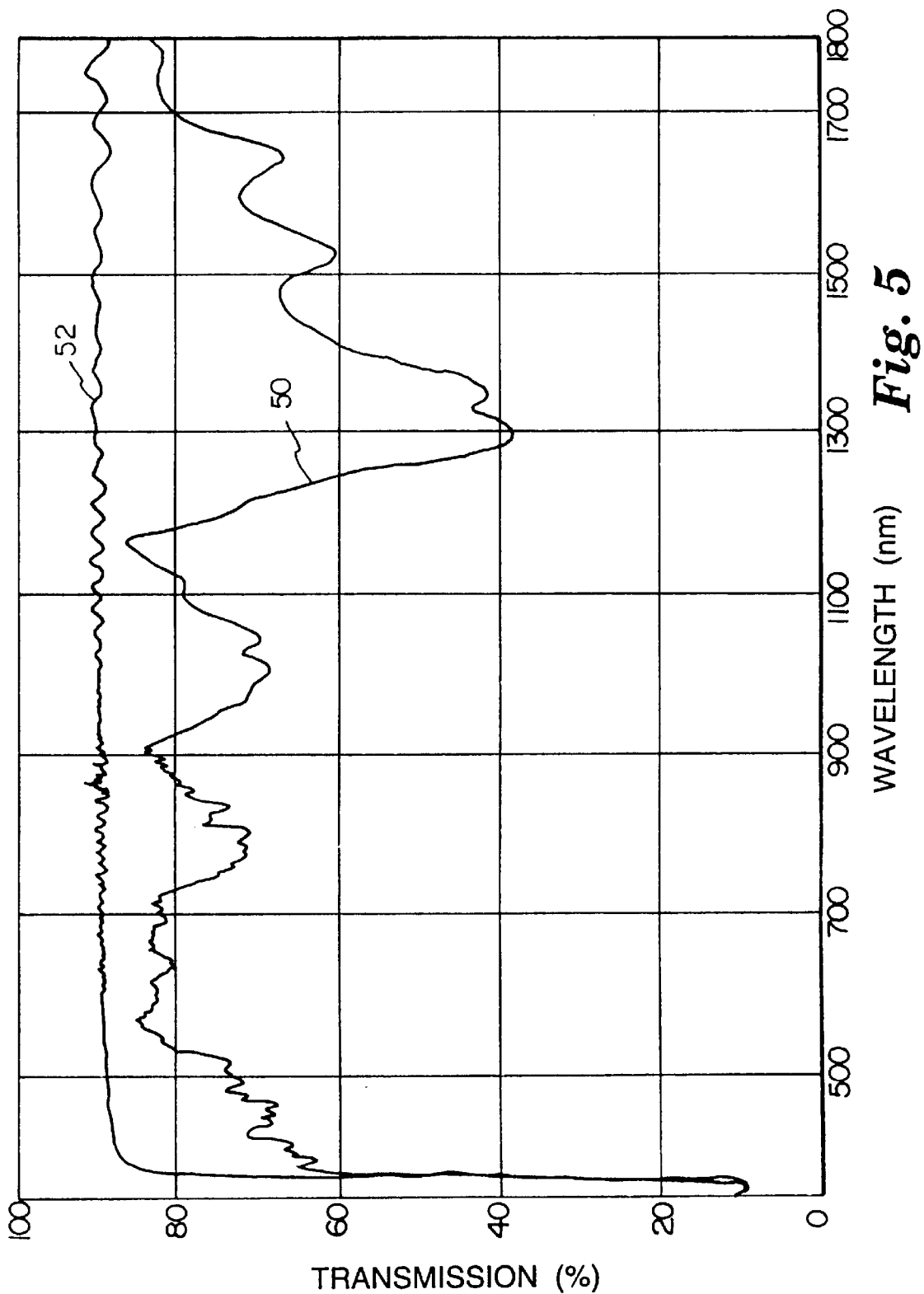
FIG. 5 is a graphical view of percent measured transmission of a 51-layer I.R. polarizer of the present invention with the first order peak near 1,300 nm.

FIG. 5 is a graphical view of percent measured transmission of the 51-layer stack in both an oriented direction 50 and in a transverse direction 52 prior to heat setting.

Figure 6:
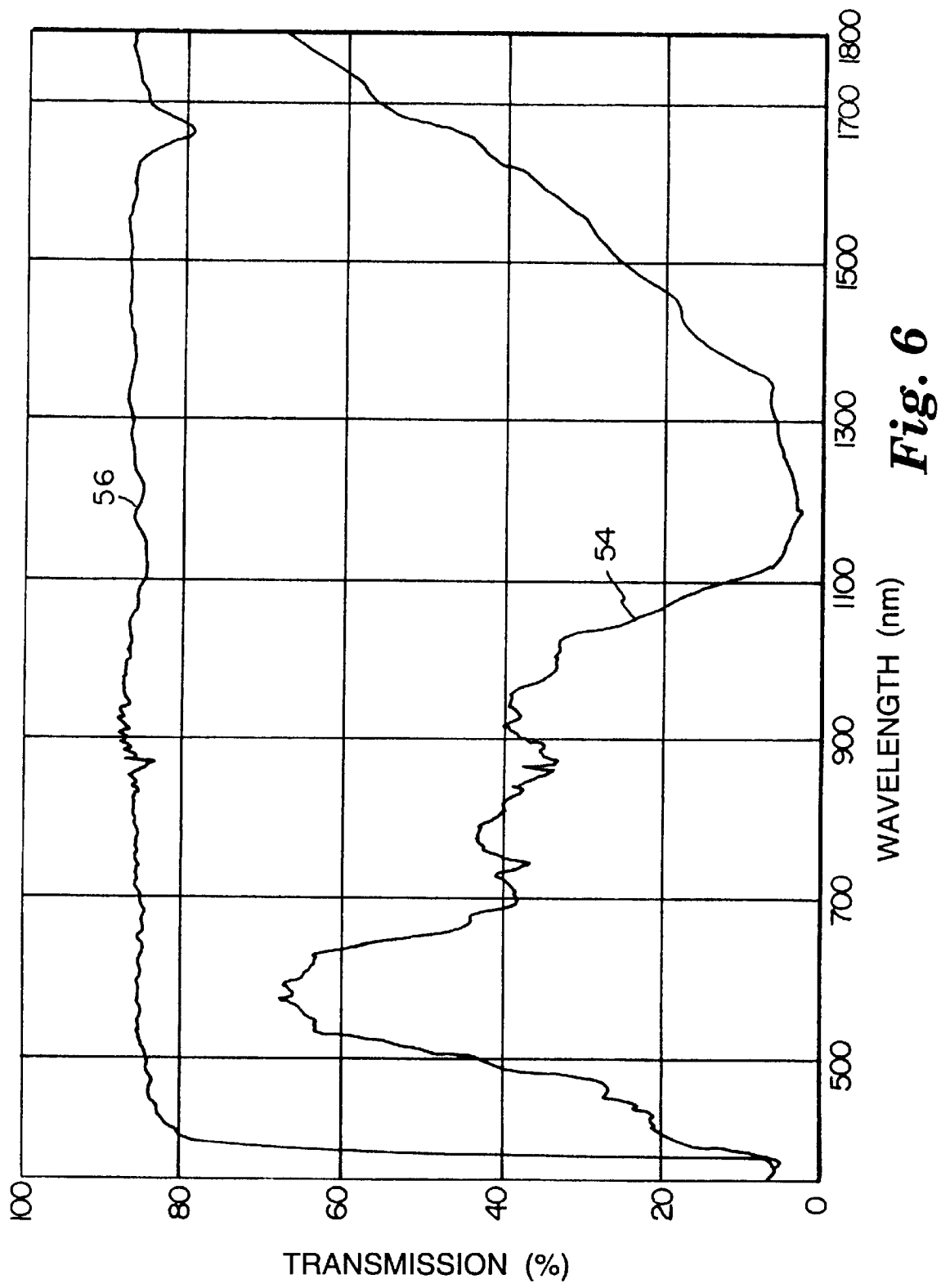
FIG. 6 is a graphical view of percent measured transmission of eight 51-layer polarizers of the present invention laminated together.

Eight 51-layered polarizers, each made as described above, were combined using a fluid to eliminate the air gaps forming a polarizer of 408 optical layers. FIG. 6 is a graph that characterizes the 408 layers showing percent transmission from 350 to 1,800 nm in both an oriented direction 54 and in a transverse direction 56.

EXAMPLE 2 (Polarizer)

A satisfactory 204-layered polarizer was made by extruding PEN and coPEN in the 51-slot feedblock as described in Example 1 and then employing two layer doubling multipliers in series in the extrusion. The multipliers divide the extruded material exiting the feed block into two half-width flow streams, then stack the half-width flow streams on top of each other. U.S. Pat. No. 3,565,985 describes similar coextrusion multipliers. The extrusion was performed at approximately 295° C. using PEN at an intrinsic viscosity of 0.50 dl/g at 22.5 lb/hr while the coPEN at an intrinsic viscosity of 0.60 dl/g was run at 16.5 lb/hr. The cast web was approximately 0.0038 inches in thickness and was uniaxially stretched at a 5:1 ratio in a longitudinal direction with the sides restrained at an air temperature of 140° C. during stretching. Except for skin layers, all pairs of layers were designed to be ½ wavelength optical thickness for 550 nm light. In the transmission spectra of FIG. 7 two reflection peaks in the oriented direction 60 are evident from the transmission spectra, centered about 550 nm. The double peak is most likely a result of film errors introduced in the layer multipliers, and the broad background a result of cumulative film errors throughout the extrusion and casting process. The transmission spectra in the transverse direction is indicated by 58. Optical extinction of the polarizer can be greatly improved by laminating two of these films together with an optical adhesive.

Figure 7:
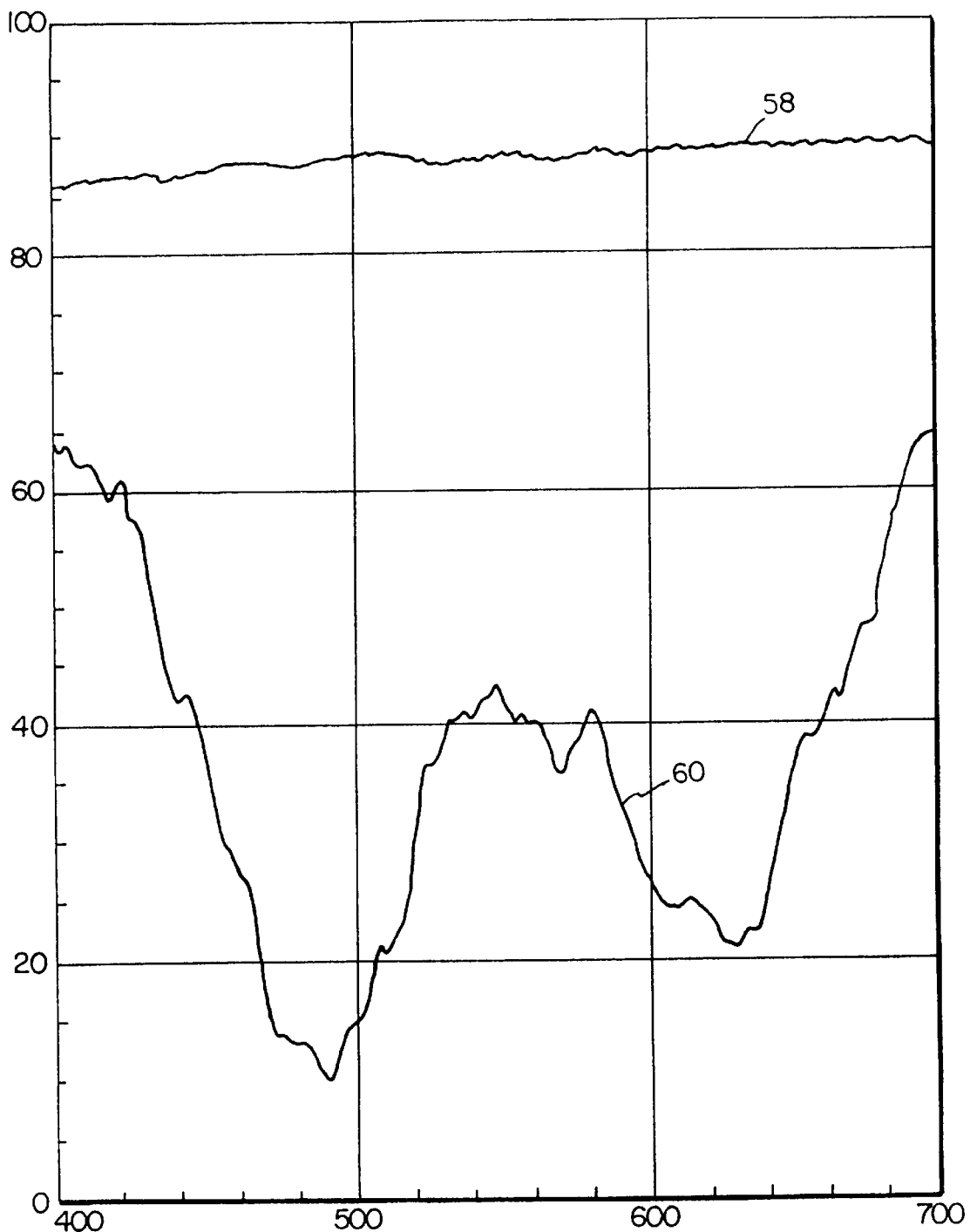
FIG. 7 is a graphical view of percent measured transmission of a 204-layer polarizer of the present invention.
Figure 8:
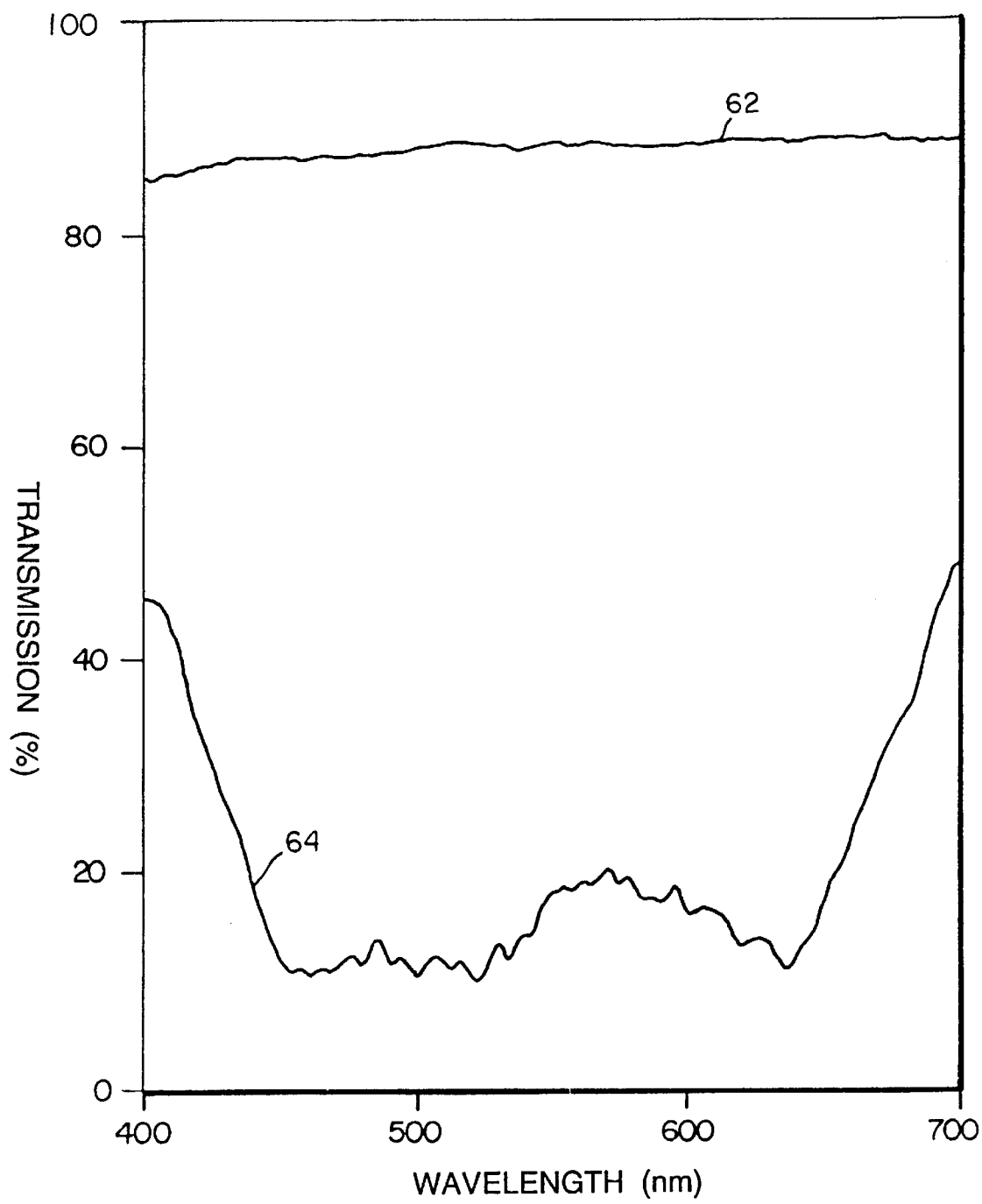
FIG. 8 is a graphical view of percent measured transmission of two 204-layer polarizers of the present invention laminated together.

Two 204-layer polarizers made as described above were then hand-laminated using an optical adhesive to produce a 408-layered film stack. Preferably the refractive index of the adhesive should match the index of the isotropic coPEN layer. The reflection peaks evident in FIG. 7 are smoothed out for a laminated sample, as shown in FIG. 8. This occurs because the peak reflectivity occurs at different wavelengths for different areas of the film, in a random pattern. This effect is often referred to as "iridescence". Lamination of two films reduces iridescence because the random variations in color do not match from one film to another, and tend to cancel when the films are overlapped.

FIG. 8 illustrates the transmission data in both the oriented direction 64 and transverse direction 62. Over 80 percent of the light in one plane of polarization is reflected for wavelengths in a range from approximately 450 to 650 nm.

The iridescence is essentially a measure of nonuniformities in the film layers in one area versus adjacent areas. With perfect thickness control, a film stack centered at one wavelength would have no color variation across the sample. Multiple stacks designed to reflect the entire visible spectrum will have iridescence if significant light leaks through random areas at random wavelengths, due to layer thickness errors. The large differential index between film layers of the polymer systems presented here enable film reflectivities of greater than 99 percent with a modest number of layers. This is a great advantage in eliminating iridescence if proper layer thickness control can be achieved in the extrusion process. Computer based optical modeling has shown that greater than 99 percent reflectivity across most of the visible spectrum is possible with only 600 layers for a PEN/coPEN polarizer if the layer thickness values are controlled with a standard deviation of less than or equal to 10 percent.

EXAMPLE 3 (PET:Ecdel, 601, Mirror)

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method (such as that described in U.S. Pat. No. 3,801,429) was used to generate 151 layers which was passed through two multipliers producing an extrudate of 601 layers. U.S. Pat. No. 3,565,985 describes exemplary coextrusion multipliers. The web was length oriented to a draw ratio of about 3.6 with the web temperature at about 210° F. The film was subsequently preheated to about 235° F. in about 50 seconds and drawn in the transverse direction to a draw ratio of about 4.0 at a rate of about 6% per second. The film was then relaxed about 5% of its maximum width in a heat-set oven set at 400° F. The finished film thickness was 2.5 mil.

Figure 21:
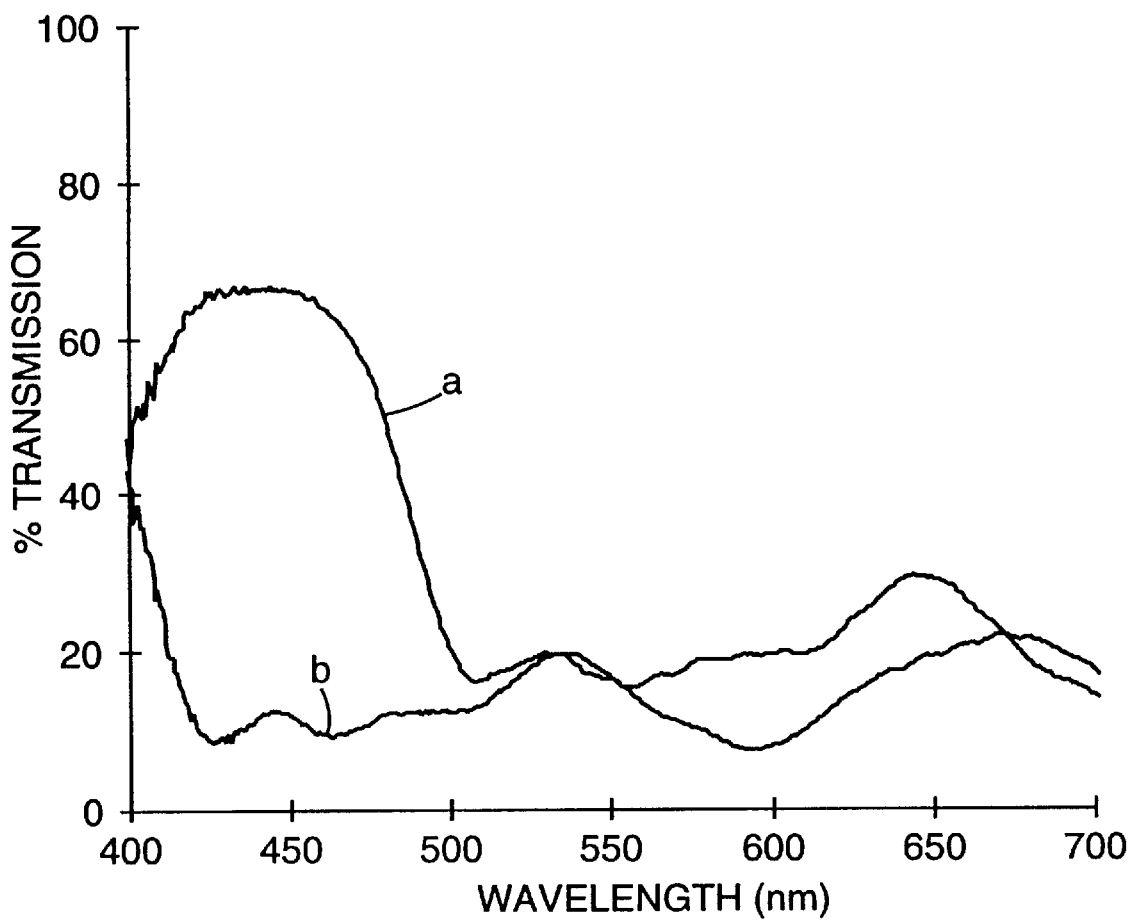
FIGS. 21–26 show optical performance of multilayer mirrors given in Examples 3–6.

The cast web produced was rough in texture on the air side, and provided the transmission as shown in FIG. 21. The % transmission for p-polarized light at a 60° angle (curve b) is similar the value at normal incidence (curve a) (with a wavelength shift).

Figure 22:
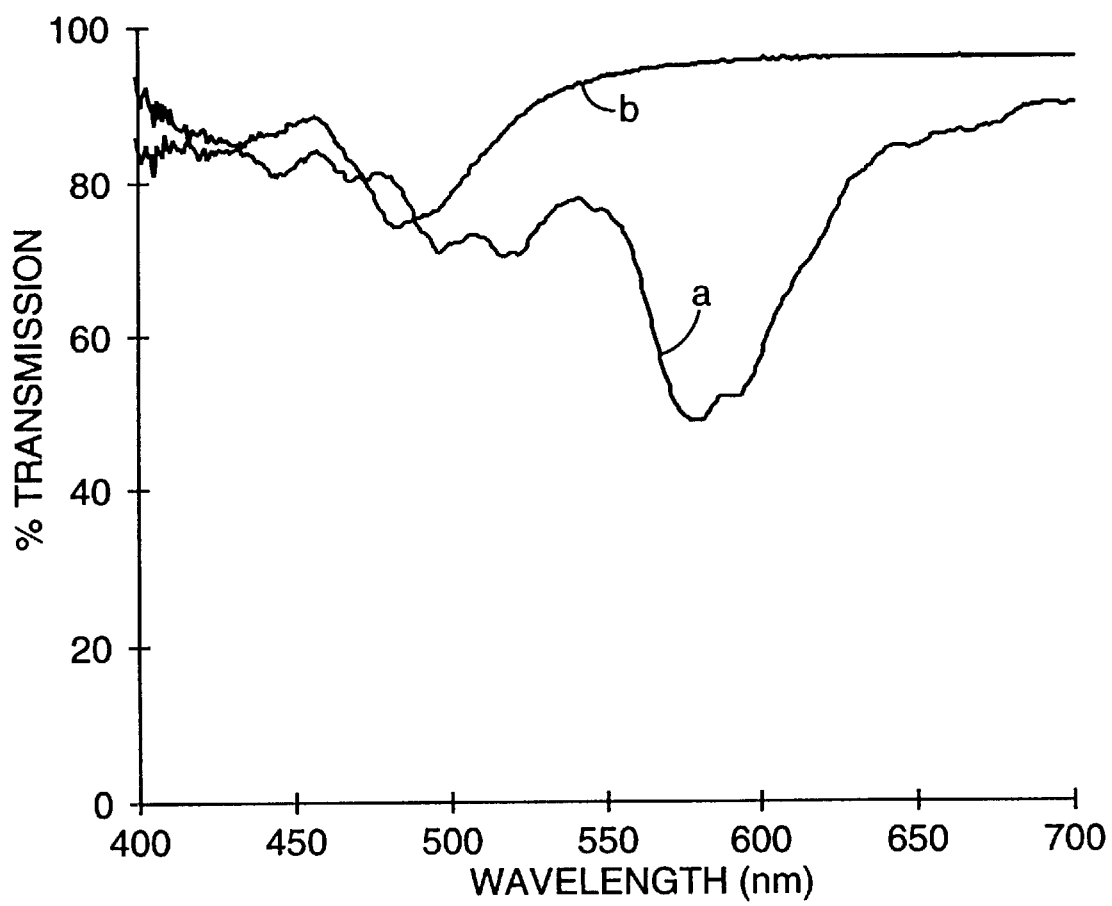

For comparison, film made by Mearl Corporation, presumably of isotropic materials (see FIG. 22) shows a noticeable loss in reflectivity for p-polarized light at a 60° angle (curve b, compared to curve a for normal incidence).

EXAMPLE 4 (PET:Ecdel, 151, Mirror)

A coextruded film containing 151 layers was made on a sequential flat-film-making line via a coextrusion process. A Polyethylene terephthalate (PET) with an Intrinsic Viscosity of 0.6 dl/g (60 wt phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method was used to generate 151 layers. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about 25% per second. The film was then relaxed about 5% of its maximum width in a heat-set oven set at 400° F. in about 6 seconds. The finished film thickness was about 0.6 mil.

Figure 23:
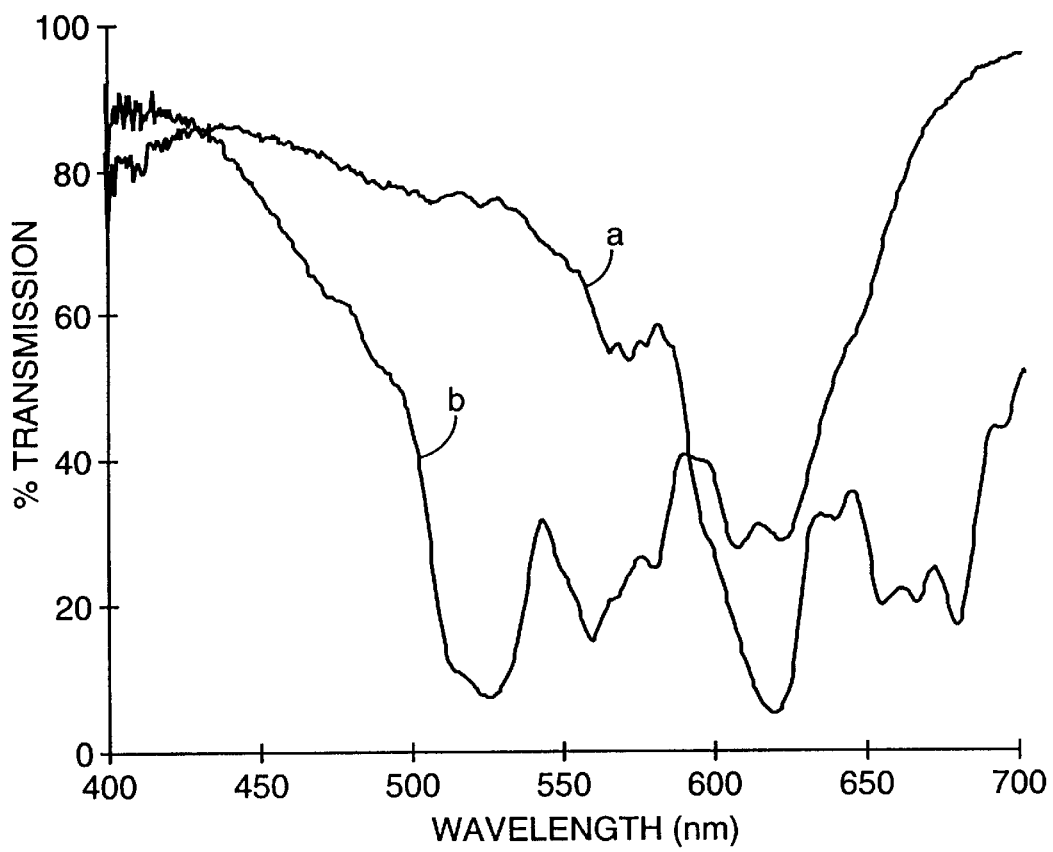
Figure 24:
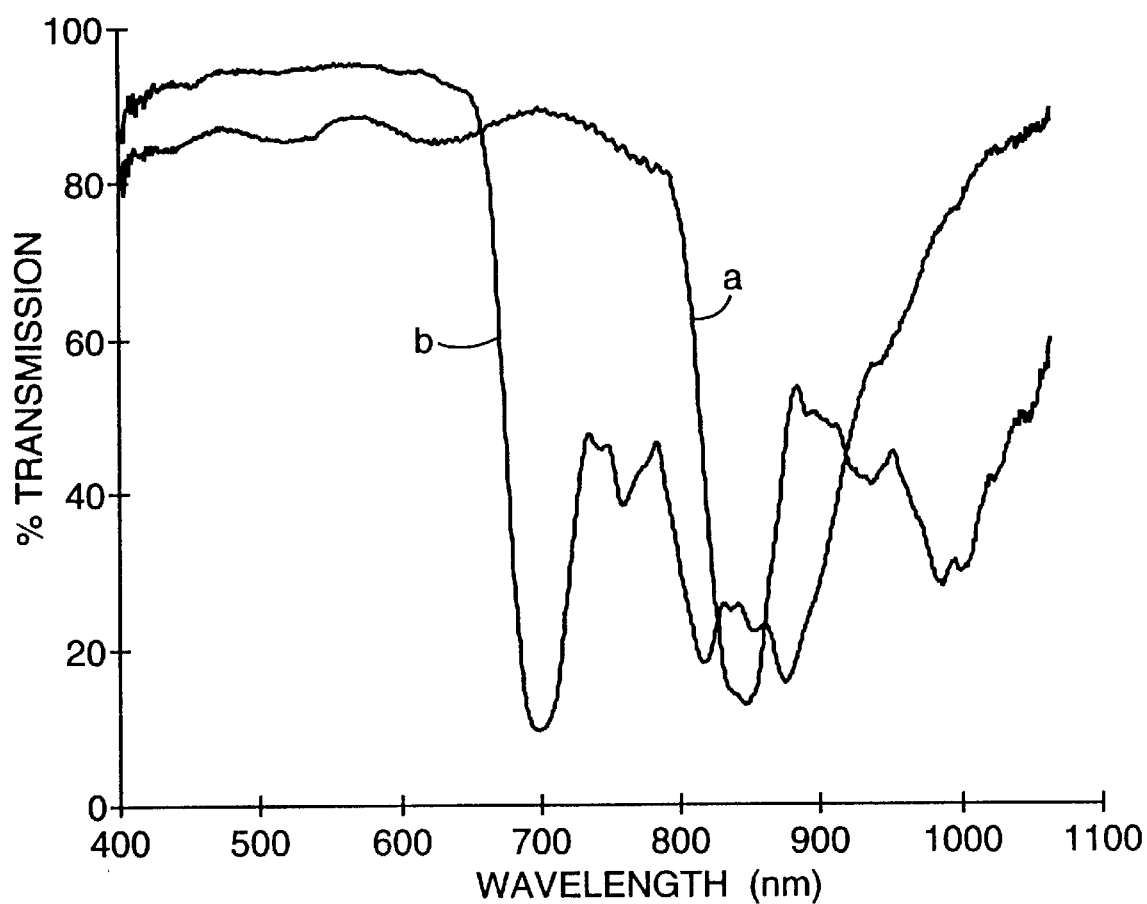

The transmission of this film is shown in FIG. 23. The % transmission for p-polarized light at a 60° angle (curve b) is similar the value at normal incidence (curve a) with a wavelength shift. At the same extrusion conditions the web speed was slowed down to make an infrared reflecting film with a thickness of about 0.8 mils. The transmission is shown in FIG. 24 (curve a at normal incidence, curve b at 60 degrees).

EXAMPLE 5 (PEN:Ecdel, 225, Mirror)

A coextruded film containing 225 layers was made by extruding the cast web in one operation and later orienting the film in a laboratory film-stretching apparatus. A Polyethylene naphthalate (PEN) with an Intrinsic Viscosity of 0.5 dl/g (60 wt. % phenol/40 wt. % dichlorobenzene) was delivered by one extruder at a rate of 18 pounds per hour and Ecdel 9966 (a thermoplastic elastomer available from Eastman Chemical) was delivered by another extruder at a rate of 17 pounds per hour. The PEN was on the skin layers. The feedblock method was used to generate 57 layers which was passed through two multipliers producing an extrudate of 225 layers. The cast web was 12 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 130° C. in 60 seconds. Stretching then commenced at 100%/sec (based on original dimensions) until the sample was stretched to about 3.5×3.5. Immediately after the stretching the sample was cooled by blowing room temperature air on it.

Figure 25:
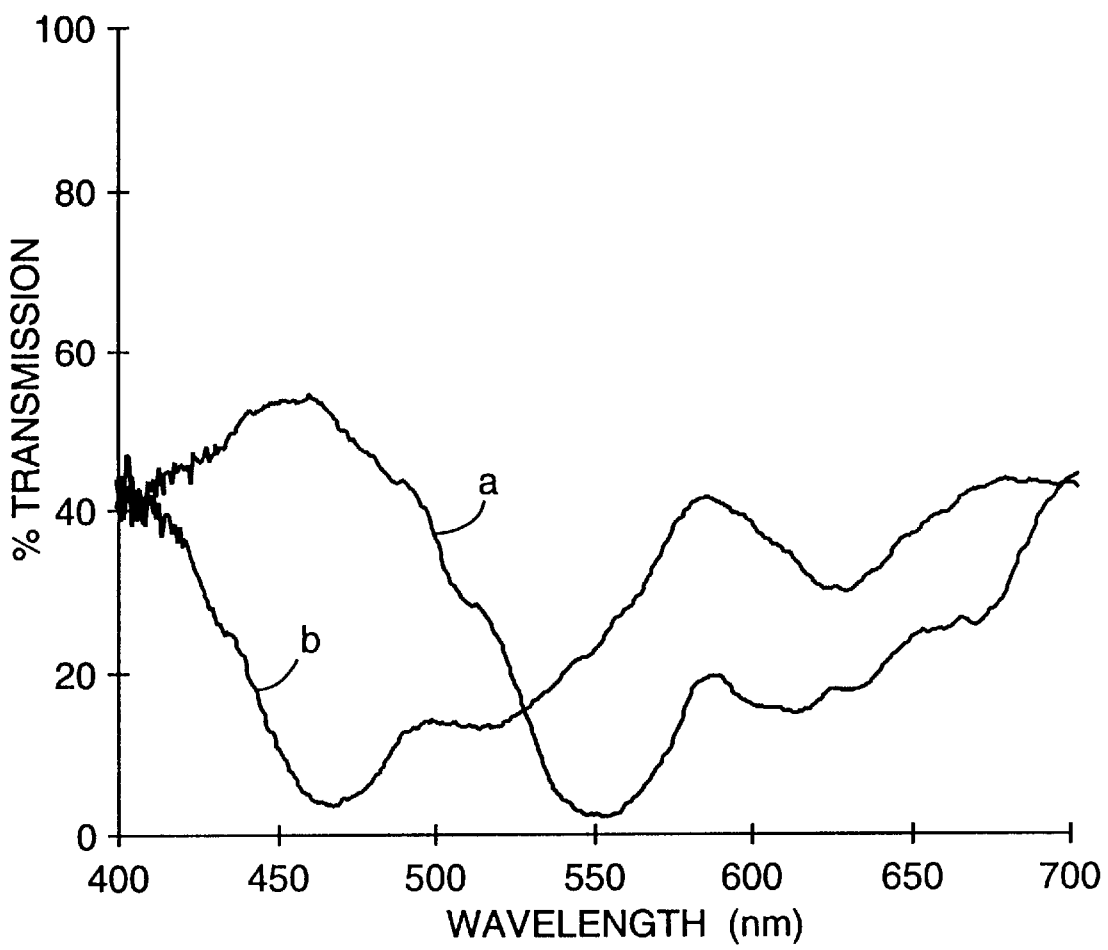

FIG. 25 shows the optical response of this multilayer film (curve a at normal incidence, curve b at 60 degrees). Note that the % transmission for p-polarized light at a 60° angle is similar to what it is at normal incidence (with some wavelength shift).

EXAMPLE 6 (PEN:THV 500, 449, Mirror)

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 26:
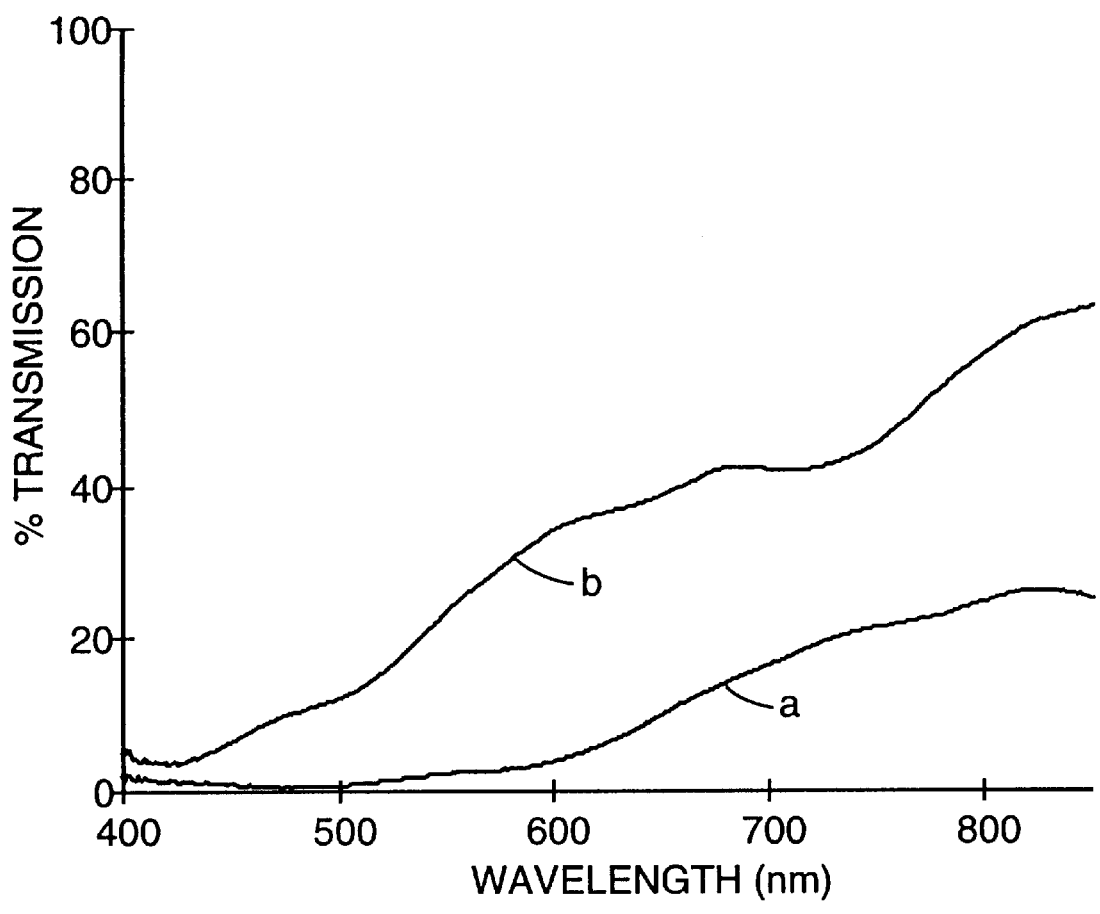

FIG. 26 shows the transmission of this multilayer film. Again, curve a shows the response at normal incidence, while curve b shows the response at 60 degrees.

EXAMPLE 7 (PEN:CoPEN, 449—Low Color Polarizer)

A coextruded film containing 449 layers was made by extruding the cast web in one operation and later orienting the film in a laboratory film-stretching apparatus. A Polyethylene naphthalate (PEN) with an Intrinsic Viscosity of 0.56 dl/g (60 wt. % phenol/40 wt. % dichlorobenzene) was delivered by one extruder at a rate of 43 pounds per hour and a CoPEN (70 mol % 2,6 NDC and 30 mol % DMI) with an intrinsic viscosity of 0.52 (60 wt. % phenol/40 wt. % dichlorobenzene) was delivered by another extruder at a rate of 25 pounds per hour. The PEN was on the skin layers and 40% of the PEN was present in the two skin layers. The feedblock method was used to generate 57 layers which was passed through three multipliers producing an extrudate of 449 layers. The cast web was 10 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 140° C. in 60 seconds. Stretching then commenced at 10%/sec (based on original dimensions) until the sample was stretched to about 5.5×1. Immediately after the stretching the sample was cooled by blowing room temperature air at it.

Figure 27:
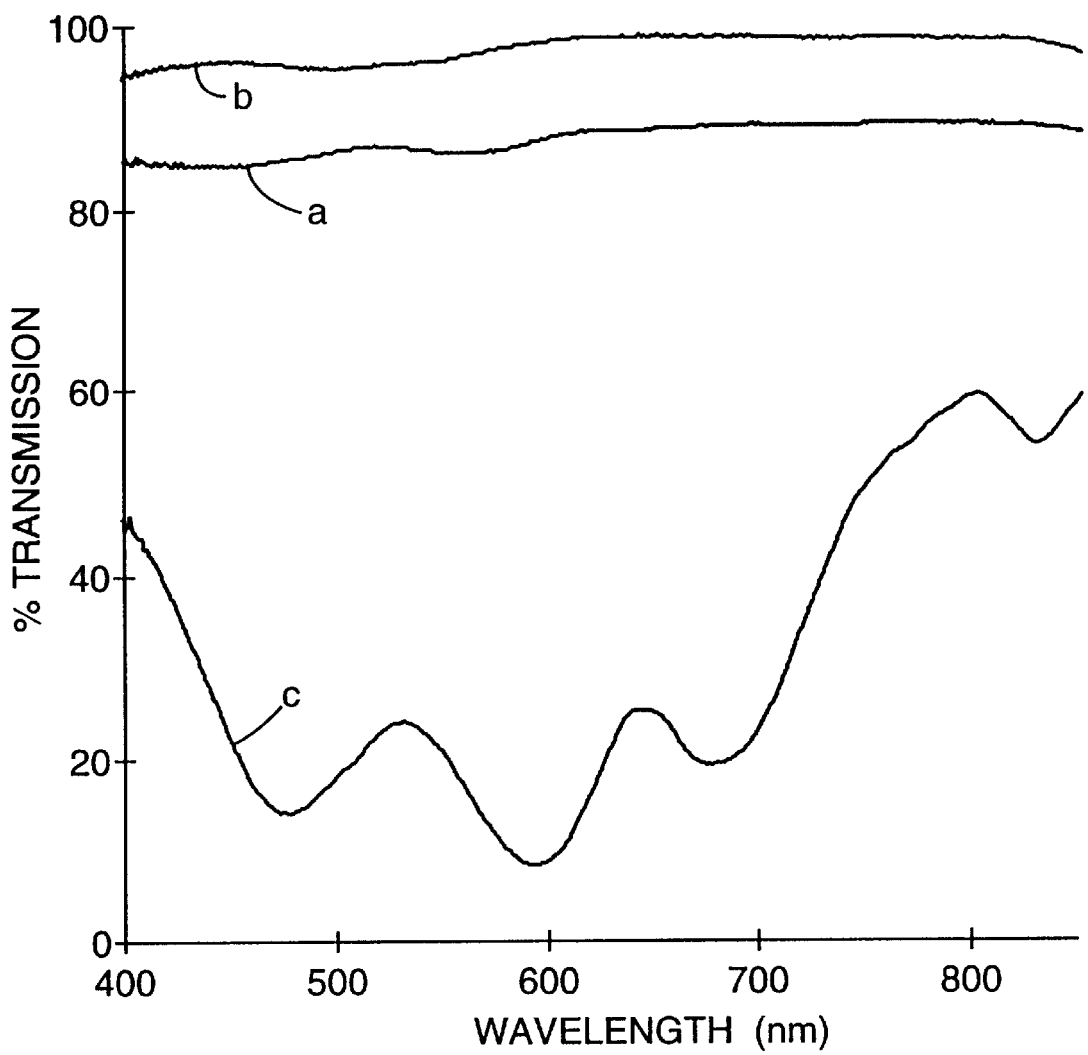
FIGS. 27–31 show optical performance of multilayer polarizers given in Examples 7–11.

FIG. 27 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of light polarized in the non-stretch direction at both normal and 60° incidence. Average transmission for curve a over 400–700 nm is 87.1%, while average transmission for curve b over 400–700 nm is 97.1%. Transmission is higher for p-polarized light at 60° incidence because the air/PEN interface has a Brewster angle near 60°, so the transmission at 60° incidence is nearly 100%. Also note the high extinction of light polarized in the stretched direction in the visible range (400–700 nm) shown by curve c, where the average transmission is 21.0%. The % RMS color for curve a is 1.5%. The % RMS color for curve b is 1.4%.

EXAMPLE 8 (PEN:CoPEN, 601—High Color Polarizer)

A coextruded film containing 601 layers was produced by extruding the web and two days later orienting the film on a different tenter than described in all the other examples. A Polyethylene Naphthalate (PEN) with an Intrinsic Viscosity of 0.5 dl/g (60 wt. % phenol/40 wt. % dichlorobenzene) was delivered by one extruder at a rate of 75 pounds per hour and a CoPEN (70 mol % 2,6 NDC and 30 mol % DMT) with an IV of 0.55 dl/g (60 wt. % phenol/40 wt. % dichlorobenzene) was delivered by another extruder at a rate of 65 pounds per hour. The PEN was on the skin layers. The feedblock method was used to generate 151 layers which was passed through two multipliers producing an extrudate of 601 layers. U.S. Pat. No. 3,565,985 describes similar coextrusion multipliers. All stretching was done in the tenter. The film was preheated to about 280° F. in about 20 seconds and drawn in the transverse direction to a draw ratio of about 4.4 at a rate of about 6% per second. The film was then relaxed about 2% of its maximum width in a heat-set oven set at 460° F. The finished film thickness was 1.8 mil.

Figure 28:
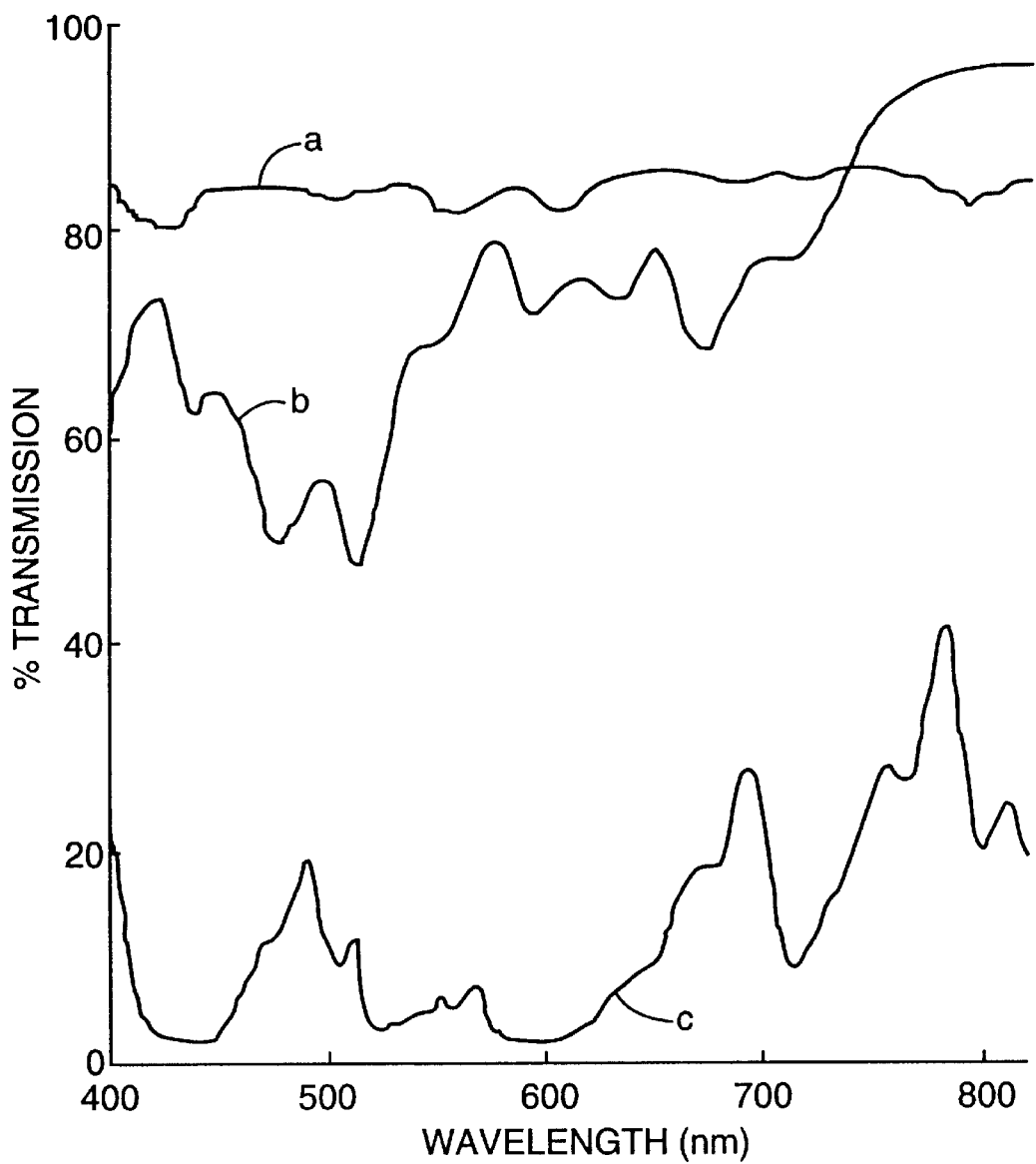

The transmission of the film is shown in FIG. 28. Curve a shows transmission of light polarized in the non-stretch direction at normal incidence, curve b shows transmission of p-polarized light at 60° incidence, and curve c shows transmission of light polarized in the stretch direction at normal incidence. Note the nonuniform transmission of p-polarized light at both normal and 60° incidence. The average transmission for curve a over 400–700 nm is 84.1%, while the average transmission for curve b over 400–700 nm is 68.2%. The average transmission for curve c is 9.1%. The % RMS color for curve a is 1.4%, and the % RMS color for curve b is 11.2%.

EXAMPLE 9 (PET:CoPEN, 449, Polarizer)

A coextruded film containing 449 layers was made by extruding the cast web in one operation and later orienting the film in a laboratory film-stretching apparatus. A Polyethylene Terephthalate (PET) with an Intrinsic Viscosity of 0.60 dl/g (60 wt. % phenol/40 wt. % dichlorobenzene) was delivered by one extruder at a rate of 26 pounds per hour and a CoPEN (70 mol% 2,6 NDC and 30 mol % DMT) with an intrinsic viscosity of 0.53 (60 wt. % phenol/40 wt. % dichlorobenzene) was delivered by another extruder at a rate of 24 pounds per hour. The PET was on the skin layers. The feedblock method was used to generate 57 layers which was passed through three multipliers producing an extrudate of 449 layers. U.S. Pat. No. 3,565,985 describes similar coextrusion multipliers. The cast web was 7.5 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 120° C. in 60 seconds. Stretching then commenced at 10%/sec (based on original dimensions) until the sample was stretched to about 5.0×1. Immediately after the stretching the sample was cooled by blowing room temperature air at it. The finished film thickness was about 1.4 mil. This film had sufficient adhesion to survive the orientation process with no delamination.

Figure 29:
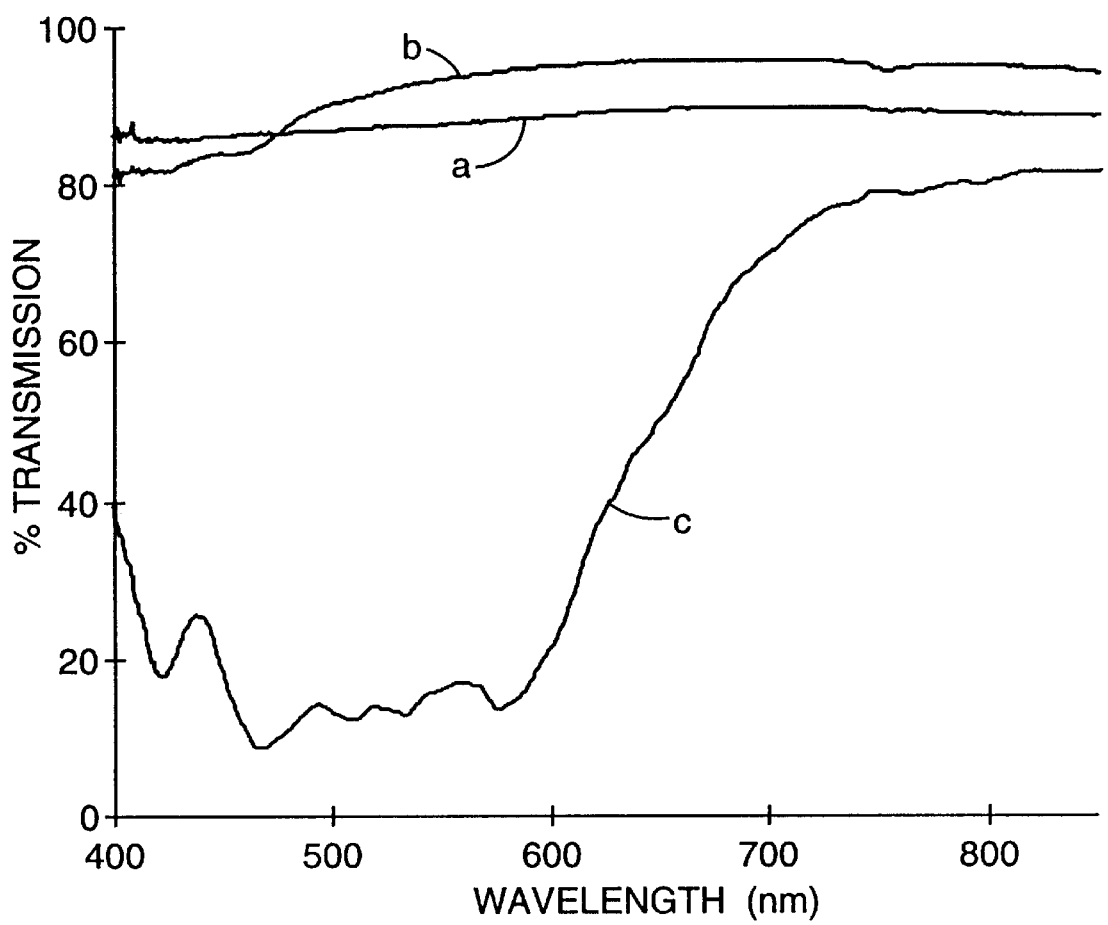

FIG. 29 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. The average transmission for curve a over 400–700 nm is 88.0%, and the average transmission for curve b over 400–700 nm is 91.2%. The average transmission for curve c over 400–700 nm is 27.9%. The % RMS color for curve a is 1.4%, and the % RMS color for curve b is 4.8%.

EXAMPLE 10 (PEN:CoPEN, 601, Polarizer)

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a gradient distribution of layers with a ration of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 30:
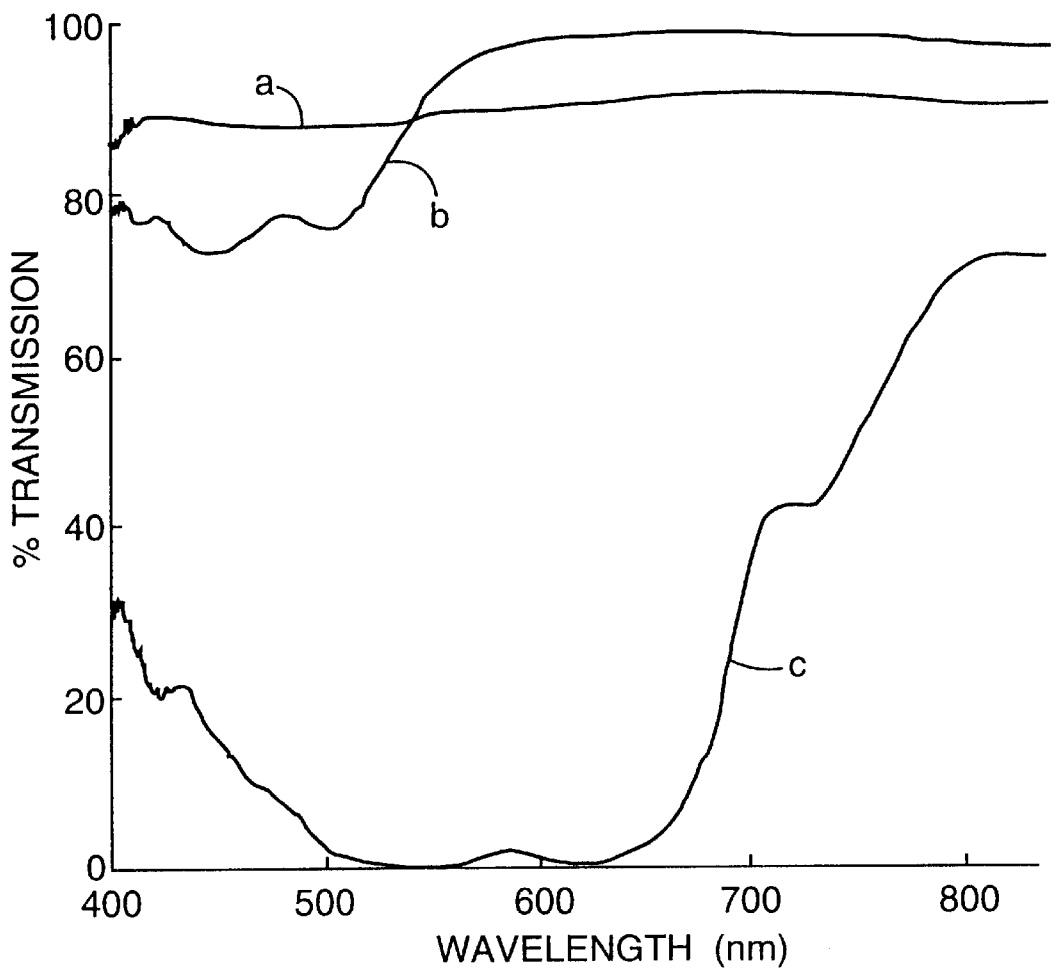

FIG. 30 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence (80–100%). Also note the very high extinction of light polarized in the stretched direction in the visible range (400–700 nm) shown by curve c. Extinction is nearly 100% between 500 and 650 nm.

EXAMPLE 11 (PEN:sPS, 481, Polarizer)

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 31:
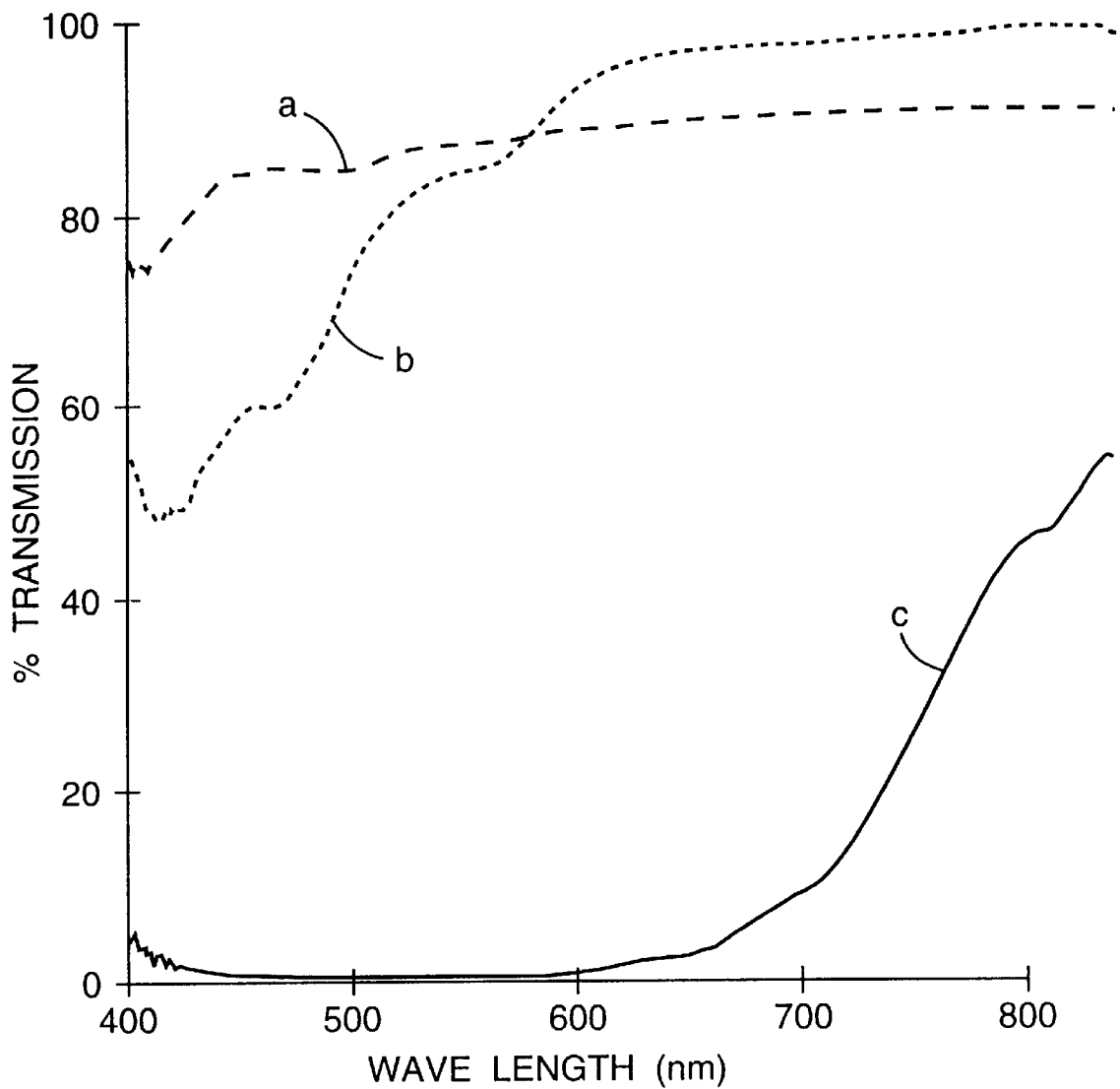

FIG. 31 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high extinction of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 12 (PET:Ecdel, 601, Mirror)

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered to the feedblock at a rate of 75 pounds per hour and Ecdel 9967 (a thermoplastic elastomer available from Eastman Chemical) was delivered at a rate of 60 pounds per hour. The PET was on the skin layers. The feedblock method was used to generate 151 layers which was passed through two multipliers producing an extrudate of 601 layers. The multipliers had a nominal multiplication ratio of 1.2 (next to feedblock) and 1.27. Two skin layers at a total throughput of 24 pounds per hour were added symmetrically between the last multiplier and the die. The skin layers were composed of PET and were extruded by the same extruder supplying the PET to the feedblock. The web was length oriented to a draw ratio of about 3.3 with the web temperature at about 205° F. The film was subsequently preheated to about 205° F. in about 35 seconds and drawn in the transverse direction to a draw ratio of about 3.3 at a rate of about 9% per second. The film was then relaxed about 3% of its maximum width in a heat-set oven set at 450° F. The finished film thickness was about 0.0027 inches.

Figure 32:
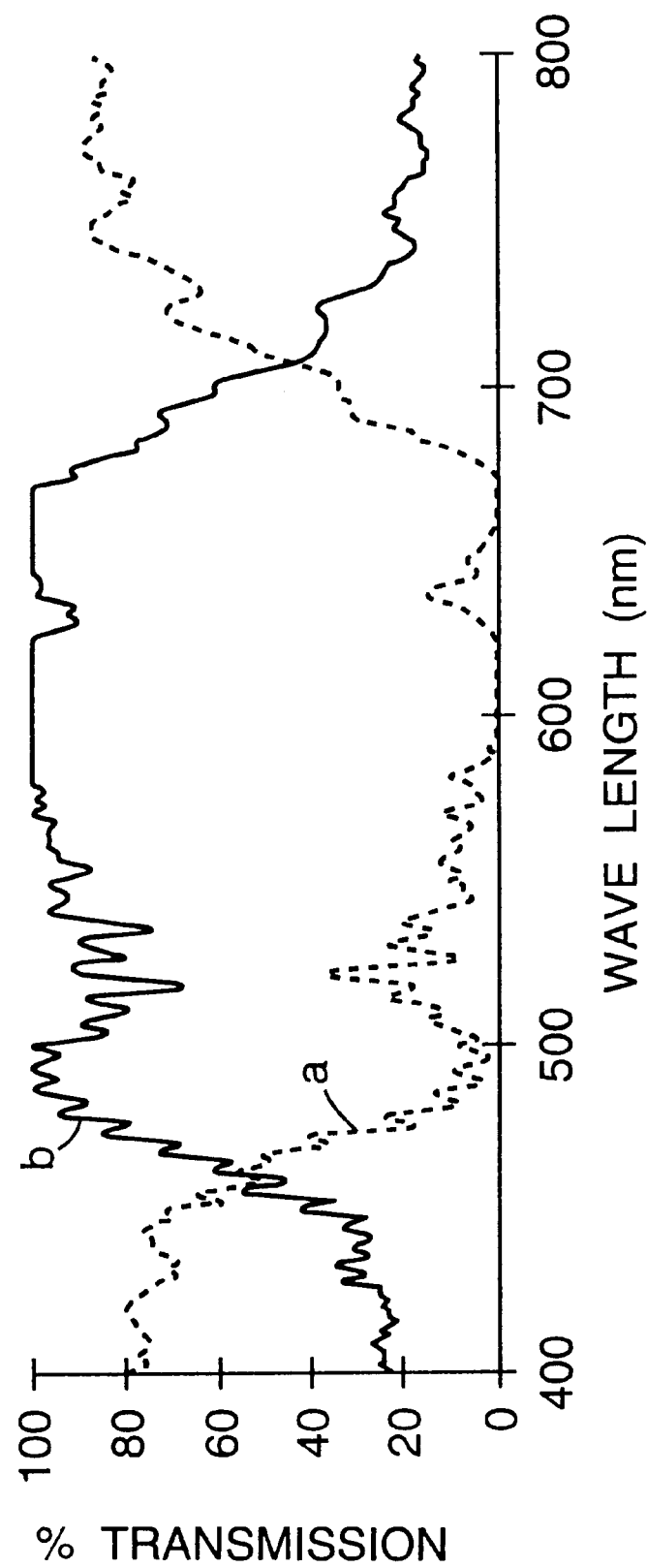
FIG. 32 shows the optical performance of the multilayer mirror given in Example 12.

The film provided the optical performance as shown in FIG. 32. Transmission is plotted as curve a and reflectivity is plotted as curve b. The luminous reflectivity for curve b is 91.5%.

EXAMPLE 13 (PEN:CoPEN, 601, Antireflected Polarizer)

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 30% dimethyl terephthalate with ethylene glycol. The feedblock method was used to generate 151 layers. The PEN skin layers were coextruded on the outside of the optical stack with a total thickness of 8% of the coextruded layers. The feedblock was designed to make a linear gradient in layer thickness for a 149 layer optical stack with the thinnest layers on one side of the stack. The individual layer thicknesses were designed in pairs to make equal thickness layers of the PEN and coPEN for each pair. Each pair thickness, d, was determined by the formula d=do+do*0.003*n, where do is the minimum pair thickness, and n is the pair number between 1 and 75. The optical stack was multiplied by two sequential multipliers. The nominal multiplication ratio of the multipliers were 1.2 and 1.27, respectively. The film was subsequently preheated to 320° F. in about 40 seconds and drawn in the transverse direction to a draw ratio of about 5.0 at a rate of 6% per second. The finished film thickness was about 2 mils.

A silical sol gel coating was then applied to one side of the reflecting polarizer film. The index of refraction of this coating was approximately 1.35. Two pieces of the AR coated reflecting polarizer film were cut out and the two were laminated to each other with the AR coatings on the outside. Transmission spectra of polarized light in the crossed and parallel directions were obtained. The sample was then rinsed with a 2% solution of ammonium bifluoride (NH4 HF2) in deionized water to remove the AR coating. Spectra of the bare multilayer were then taken for comparison to the coated sample.

Figure 33:
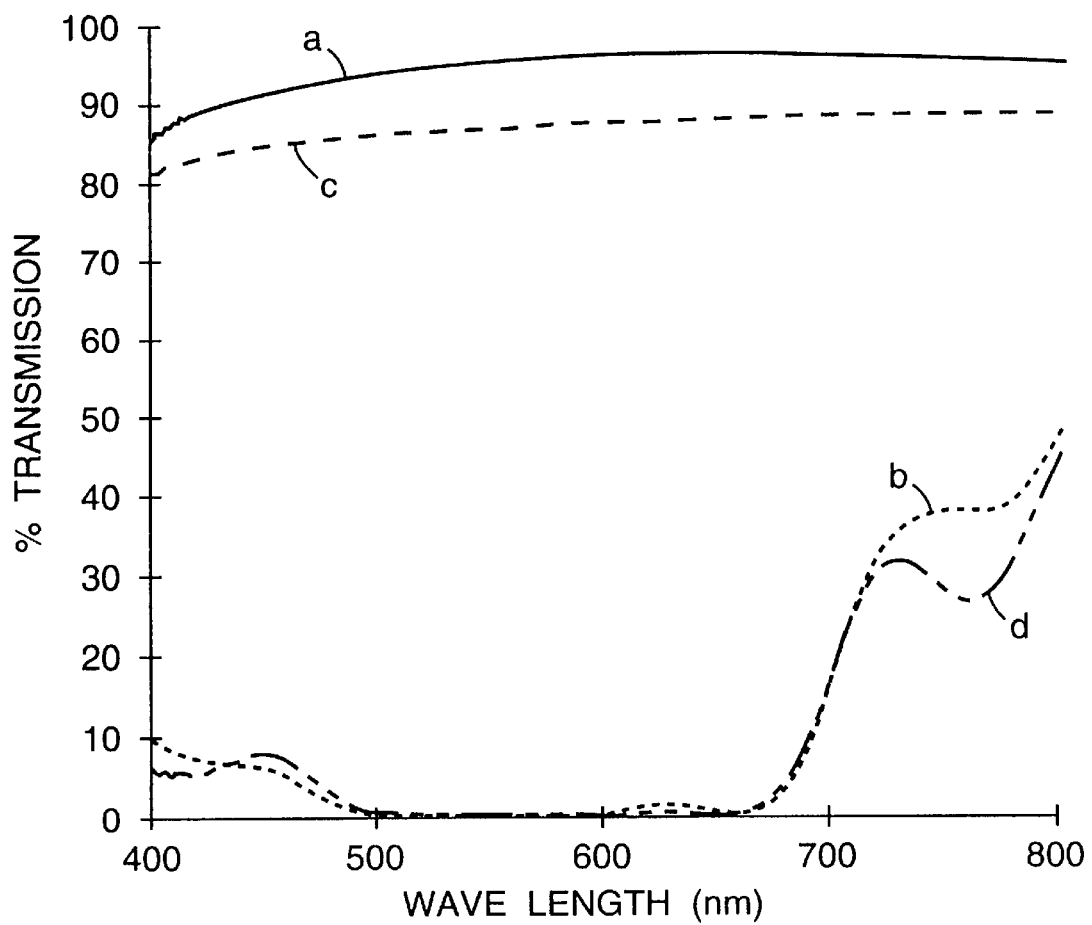
FIG. 33 shows the optical performance of the AR coated multilayer reflective polarizer of Example 13.

FIG. 33 shows the spectra of the coated and uncoated polarizer. Curves a and b show the transmission and extinction, respectively, of the AR coated reflecting polarizer, and curves c and d show the transmission and extinction, respectively, of the uncoated reflecting polarizer. Note that the extinction spectrum is essentially unchanged, but that the transmission values for the AR coated polarizer are almost 10% higher. Peak gain was 9.9% at 565 nm, while the average gain from 425 to 700 nm was 9.1%. Peak transmission of the AR coated polarizer was 97.0% at 675 nm. Average transmissions for curve a over 400–700 nm was 95.33%, and average transmission for curve d over 400–700 nm was 5.42%.

EXAMPLE 14 (PET:Ecdel, 601, Polarizer)

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to a feedblock by one extruder at a rate of 75 pounds per hour and Ecdel 9967 (a thermoplastic elastomer available from Eastman Chemical) was delivered to the feedblock by another extruder at a rate of 60 pounds per hour. The PET was on the skin layers. The feedblock method was used to generate 151 layers which passed through two multipliers (2x) producing an extrudate of 601 layers. A side stream with a throughput of 50 pounds per hour was taken from the PET extruder and used to add two skin layers between the last multiplier and the die. The web was length oriented to a draw ratio of about 5.0 with the web temperature at about 210° F. The film was not tentered. The finished film thickness was about 2.7 mil.

Figure 34:
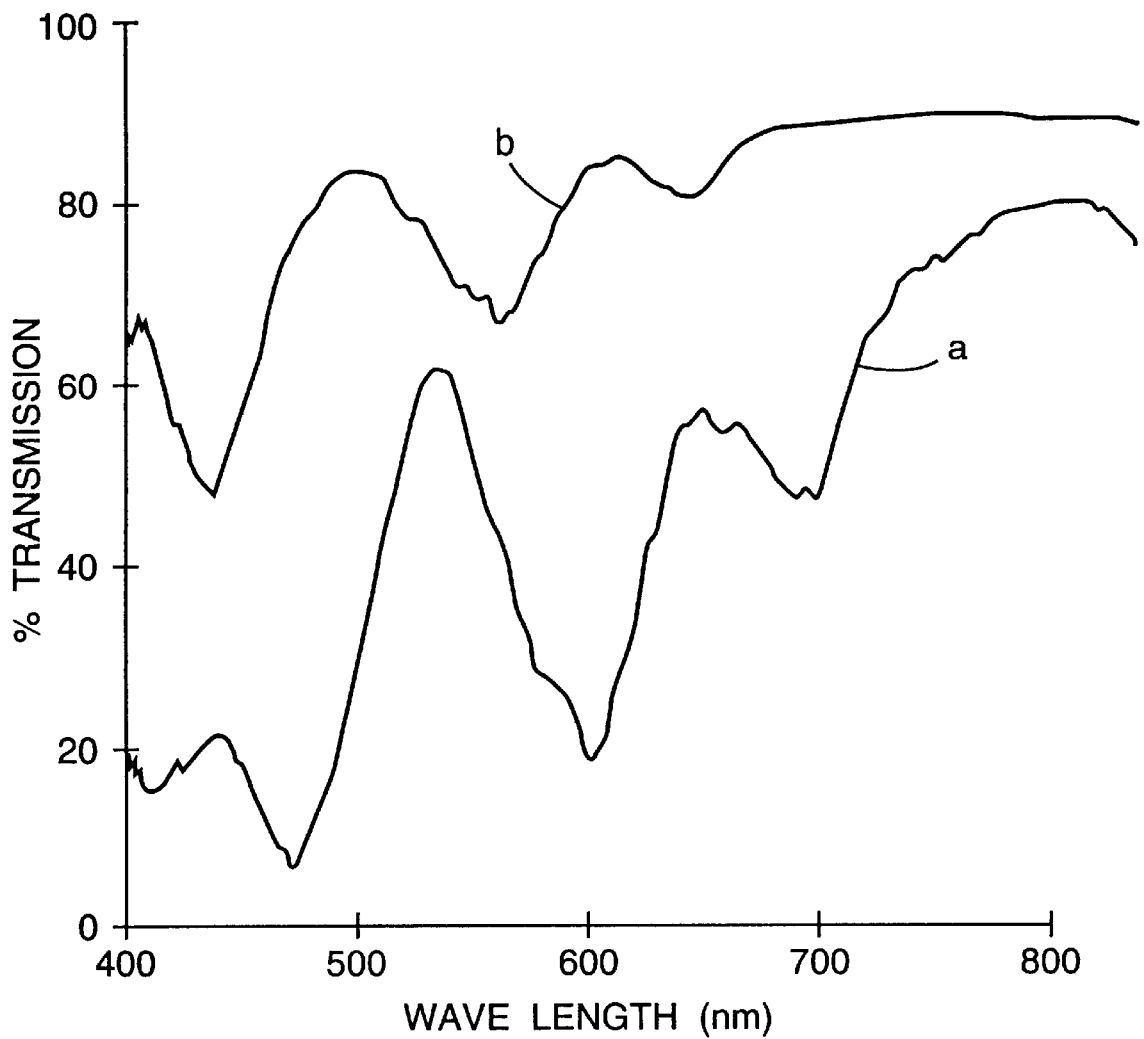
FIG. 34 shows the optical performance of the multilayer reflective polarizer of Example 14.

FIG. 34 shows the transmission for this film. Curve a shows the transmission of light polarized in the stretch direction, while curve b shows the transmission of light polarized orthogonal to the stretch direction. The average transmission from 400–700 nm for curve a is 39.16%.

EXAMPLE 15 (PEN:CoPEN, 449, Polarizers)

A coextruded film containing 449 layers was made by extruding the cast web in one operation and later orienting the film in a laboratory film-stretching apparatus. A polyethylene naphthalate (PEN) with an Intrinsic Viscosity of 0.53 dl/g (60 wt. % phenol/40 wt. % dichlorobenzene) was delivered by one extruder at a rate of 26.7 pounds per hour to the feedblock and a different material was delivered by second extruder at a rate of 25 pounds per hour to the feedblock. The PEN was the skin layers. The feedblock method was used to generate 57 layers which passed through three multipliers producing an extrudate of 449 layers. The cast web was 0.0075 mils thick and 12 inches wide. The web was later uniaxially oriented using a laboratory stretching device that uses a pantograph to grip a square section of film and stretch it in one direction at a uniform rate while it is constrained in the other. A 7.46 cm square of web was loaded into the stretcher at about 100° C. and heated to 140° C. for 60 seconds. Stretching then commenced at 10%/sec (based on original dimensions) until the sample was stretched to about 5.5x1. Immediately after stretching, the sample was cooled by blowing room temperature air at it.

The input to the second extruder was varied by blending pellets of the following poly(ethylene esters) three materials:

(i) a CoPEN (70 mol % 2,6-napthalene dicarboxylate and 30 mol % terephthalate) with an intrinsic viscosity of 0.52 (60 wt. % phenol/40 wt. % dichlorobenzene); (ii) the PEN, same material as input to first extruder; (iii) a PET, with an intrinsic viscosity of 0.95 (60 wt. % phenol/40 wt. % dichlorobenzene). TTF 9506 purchased from Shell.

Figure 35A:
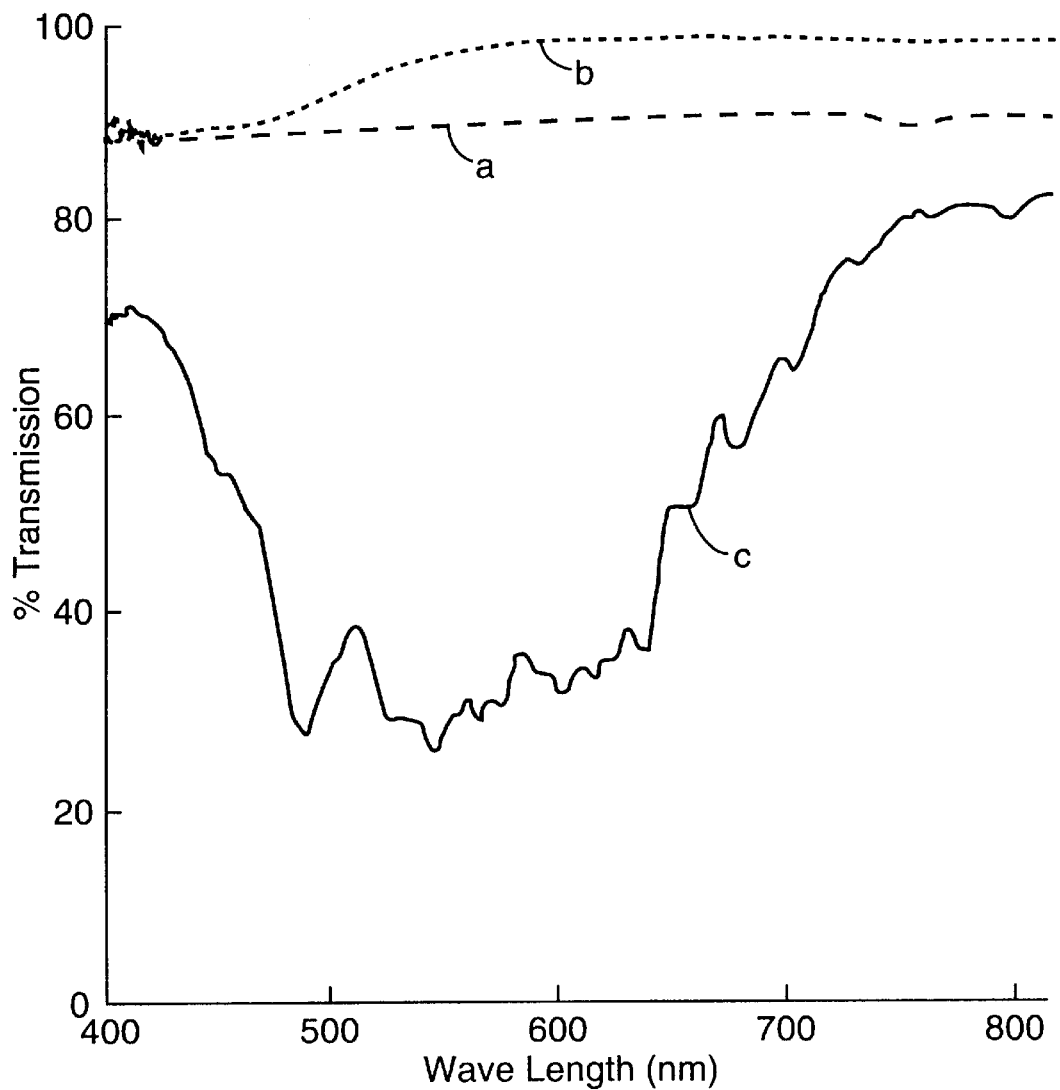
FIGS. 35a–c show optical performance of multilayer polarizers given in Example 15.
Figure 35B:
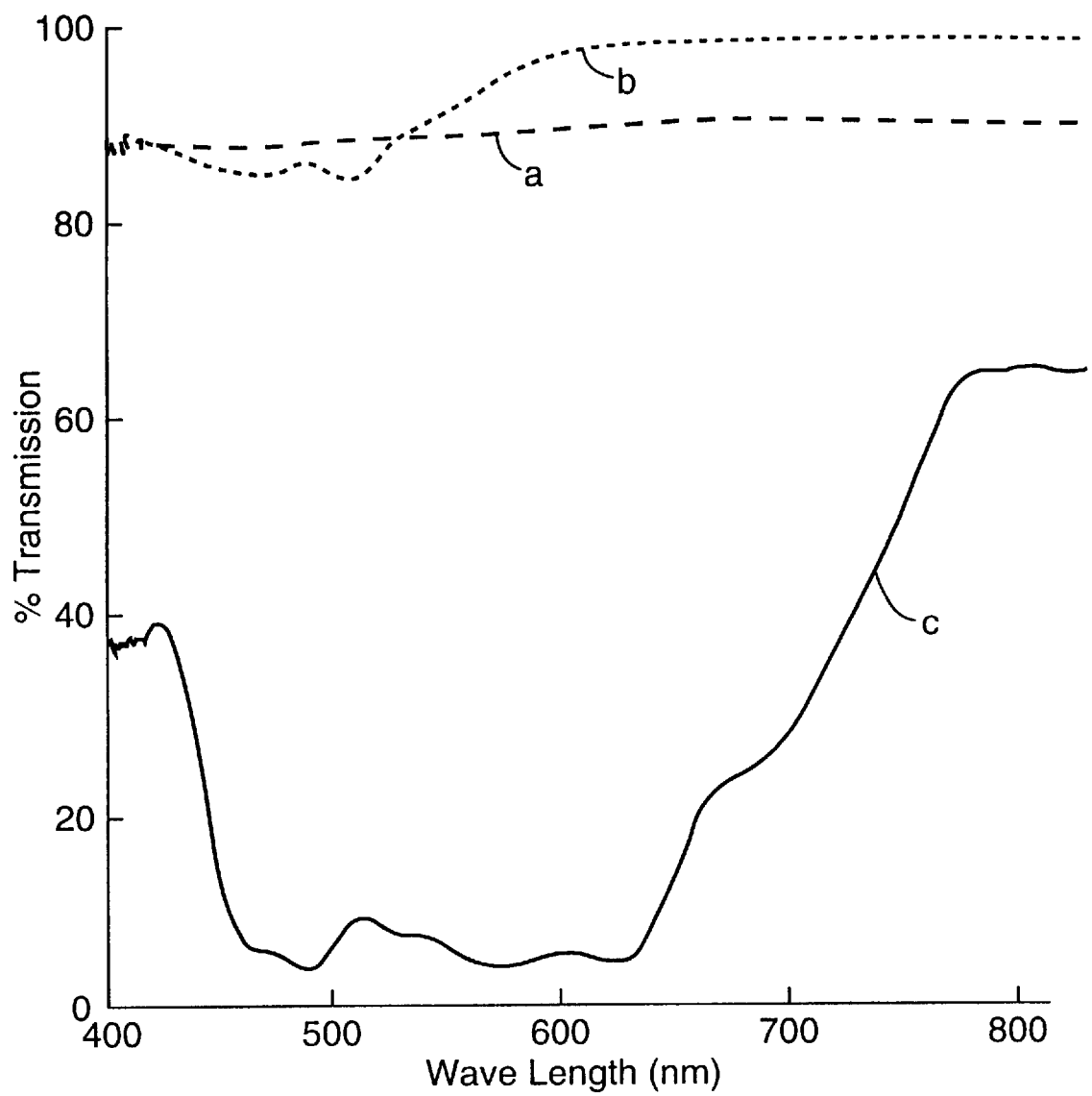
Figure 35C:
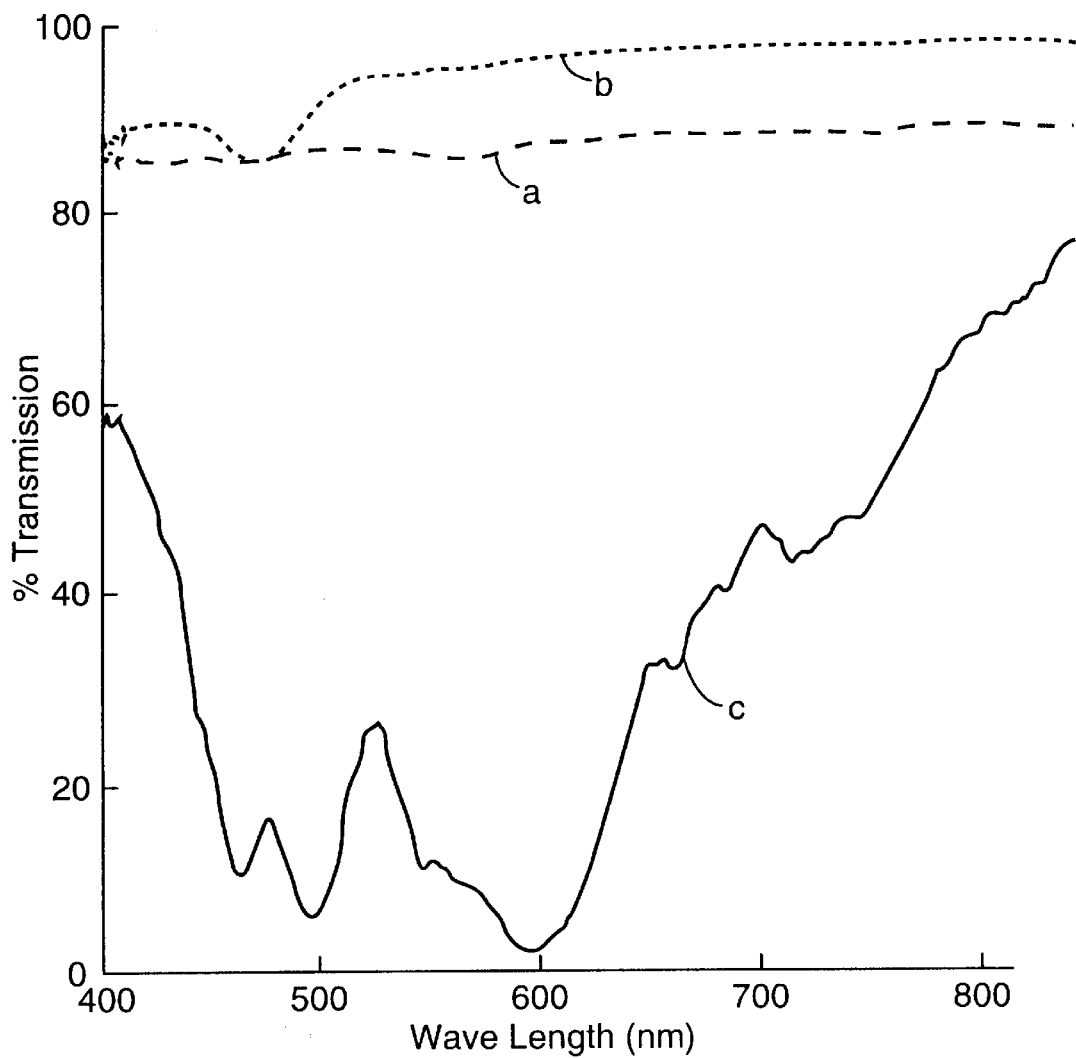

For the film shown in FIG. 35A the input to the second extruder was 80-wt % of the COPEN and 20 wt % of the PEN; for the film shown in FIG. 35B the input to the second extruder was 80 wt % of the COPEN and 20 wt % of the PET; for the film shown in FIG. 35C the input to the second extruder was CoPEN.

FIGS. 35A, 35B, and 35C show the transmission of these multilayer films where curve a shows transmission of light polarized in the non-stretch direction at normal incidence, curve b shows transmission of p-polarized light polarized in the non-stretched direction at 60° incidence, and curve c shows transmission of light polarized in the stretch direction at normal incidence. Note that the optical response of these films is sensitive to the chemical composition of the layers from the second extruder. The average transmission for curve c in FIG. 35A is 43.89%, the average transmission for curve c in FIG. 35B is 21.52%, and the average transmission for curve c in FIG. 35C is 12.48%. Thus, extinction is increased from FIG. 35A to FIG. 35C.

For the examples using the 57 layer feedblock, all layers were designed for only one optical thickness (¼ of 550 nm), but the extrusion equipment introduces deviations in the layer thicknesses throughout the stack resulting in a fairly broadband optical response. For examples made with the 151 layer feedblock, the feedblock is designed to create a distribution of layer thicknesses to cover a portion of the visible spectrum. Asymmetric multipliers were then used to broaden the distribution of layer thicknesses to cover most of the visible spectrum as described in U.S. Pat. Nos. 5,094,788 and 5,094,793.

Although the present invention has been described with reference to preferred embodiments, those of skill in the art will recognize that changes may be made in form and detail without departing from the spirit and scope of the invention.

We claim:

1. A process for forming a reflective polarizer, the process comprising the steps of:

forming a multilayer film comprising alternating layers of a first stress-induced birefringent polymeric material and second polymeric material, the film being defined in reference to a coordinate system of first and second orthogonal in-plane axes and a third mutually orthogonal axis in a thickness direction of the film; and stretching the film along the first in-plane axis of the film while allowing dimensional relaxation of the film along the second in-plane axis of the film to achieve a desired relationship among refractive indices of the first and second polymeric material along the first, second and third axes.

2. A process as recited in claim 1, wherein, while stretching the film along the first in-plane axis of the film, the film is allowed to dimensionally relax along the second in-plane axis of the film with a relaxation ratio of 1:0.5.

3. A process as recited in claim 1, wherein the film is stretched along the first in-plane axis to a first stretch ratio and, while stretching the film along the first in-plane axis of the film, the film is allowed to dimensionally relax along the second in-plane axis by an amount approximately equal to the square root of the first stretch ratio.

4. A process as recited in claim 1, wherein the film is stretched along of the first in-plane axis to a first stretch ratio and, while stretching the film along the first in-plane axis of the film, the film is allowed to dimensionally relax along the second in-plane axis of the film by an amount which is less than or equal to the square root of the predetermined stretch ratio.

5. A process as recited in claim 1, wherein the second material is a stress-induced birefringent polymeric material.

6. A process as recited in claim 1, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane axis is less than 0.25.

7. A process as recited in claim 1, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane axis is less than 0.10.

8. A process as recited in claim 1, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane axis is less than 0.05.

9. A process as recited in claim 1, wherein the second material is selected such that a ratio of the difference in refractive indices of the first and second polymeric materials along the third axis to the difference in refractive indices of the first and second polymeric materials along the first in-plane axis is less than 0.50.

10. A process as recited in claim 1, wherein the second material is selected such that a ratio of the difference in refractive indices of the first and second polymeric materials along the third axis to the difference in refractive indices of the first and second polymeric materials along the first in-plane axis is less than 0.25.

11. A process as recited in claim 1, wherein the film is stretched along the first in-plane axis of the film and the second material is selected such that a ratio of the difference in refractive indices of the first and second polymeric materials along the third axis to the difference in refractive indices of the first and second polymeric materials along the first in-plane axis is essentially zero.

12. A process as recited in claim 1, wherein the first polymeric material comprises a polyester or copolyester based on naphthalene dicarboxylic acid or an ester thereof.

13. A process as recited in claim 1, wherein the first polymeric material comprises a polyester or copolyester based on terephthalic acid or an ester thereof.

14. A reflective polarizer manufactured according to the process of claim 1.

15. A process for forming a reflective polarizer, the process comprising the steps of:

forming a multilayer film comprising alternating layers of a first stress-induced birefringent polymeric material and second polymeric material, the film being defined in relationship to a coordinate system of first and second orthogonal in-plane axes and a third mutually orthogonal axis in a thickness direction of the film, each material having respective refractive indices along the first, second and third axes; and stretching the film along the first in-plane axis of the film while allowing dimensional relaxation of the film along the second in-plane axis of the film to produce a difference in the refractive indices of the first and second polymeric materials along the first in-plane axis, the second material being selected such that, after stretching, any difference between the refractive index of the first material along the second in-plane axis of the film and the refractive index of the second material along the second in-plane axis of the film, and any difference in the refractive index of the first material along the third axis of the film and the refractive index of the second material along the third axis of the film are less than 50% of the difference in the refractive indices of the first and second polymeric materials along the first in-plane axis of the film.

16. A process as recited in claim 15, wherein the difference in refractive indices of the first and second material along the second in-plane axis of the film has the same sign as the difference in the refractive indices of the first and second material along the third axis.

17. A process as recited in claim 15, wherein the difference in refractive indices of the first and second material along the second in-plane axis of the film and the difference in the refractive indices of the first and second material along the third axis are essentially zero.

18. A process as recited in claim 15, wherein, while stretching the film along the first in-plane axis of the film, the film is allowed to dimensionally relax along the second in-plane axis of the film with a relaxation ratio of 1:0.5.

19. A process as recited in claim 15, wherein the film is stretched along the first in-plane axis to a first stretch ratio and, while stretching the film along the first in-plane axis of the film, the film is allowed to dimensionally relax along the second in-plane axis of the film by an amount approximately equal to the square root of the first stretch ratio.

20. A process as recited in claim 15, wherein the film is stretched along the first in-plane axis to a first stretch ratio and, while stretching the film along the first in-plane axis of the film, the film is allowed to dimensionally relax along the second in-plane axis by an amount which is less than or equal to the square root of the first stretch ratio.

21. A process as recited in claim 15, wherein the second material is a stress-induced birefringent polymeric material.

22. A process as recited in claim 15, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane ax-s is less than 0.25.

23. A process as recited in claim 15, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane axis is less than 0.10.

24. A process as recited in claim 15, wherein the film is stretched along the first in-plane axis of the film and the second material is selected such that a ratio of the difference in refractive indices of the first and second polymeric materials along the second in-plane axis to the difference in refractive indices of the first and second polymeric materials along the first in-plane axis is less than 0.05.

25. A process as recited in claim 15, wherein the film is stretched along the first in-plane axis of the film and the second material is selected such that a ratio of the difference in refractive indices of the first and second polymeric materials along the third axis to the difference in refractive indices of the first and second polymeric materials along the first in-plane axis is less than 0.25.

26. A process as recited in claim 15, wherein the film is stretched along the first in-plane axis of the film and the second material is selected such that a ratio of the difference in refractive indices of the first and second polymeric materials along the third axis to the difference in refractive indices of the first and second polymeric materials along the first in-plane axis is essentially zero.

27. A process as recited in claim 15, wherein the first polymeric material comprises a polyester or copolyester based on naphthalene dicarboxylic acid or an ester thereof.

28. A process as recited in claim 15, wherein the first polymeric material comprises a polyester or copolyester based on terephthalic acid or an ester thereof.

29. A reflective polarizer manufactured according to the process of claim 15.

* * * * *

UNITED STATES PATENT AND TRADEMARK OFFICE
CERTIFICATE OF CORRECTION

PATENT NO. : 5,965,247
DATED : Oct. 12, 1999
INVENTOR(S) : Jonza et al.

It is certified that error appears in the above-identified patent and that said Letters Patent is hereby corrected as shown below:

In claim 1, column 27, line 67, delete the word "of".

Signed and Sealed this

Twentieth Day of June, 2000

Attest:

Q. TODD DICKINSON

*Attesting Officer*      *Director of Patents and Trademarks*